(12) United States Patent
Menon

(10) Patent No.: US 12,323,183 B2
(45) Date of Patent: Jun. 3, 2025

(54) TEST MODULES FOR NETWORK TEST INSTRUMENT UTILIZING CONTAINERS

(71) Applicant: VIAVI SOLUTIONS INC., Chandler, AZ (US)

(72) Inventor: Jyotikumar Menon, Clarksburg, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 309 days.

(21) Appl. No.: 18/113,287

(22) Filed: Feb. 23, 2023

(65) Prior Publication Data

US 2023/0268992 A1    Aug. 24, 2023

Related U.S. Application Data

(60) Provisional application No. 63/313,421, filed on Feb. 24, 2022.

(51) Int. Cl.
*H04B 10/07* (2013.01)
*H04B 10/073* (2013.01)

(52) U.S. Cl.
CPC .................................. *H04B 10/073* (2013.01)

(58) Field of Classification Search
CPC ....................................................... H04B 10/07
See application file for complete search history.

(56) References Cited

U.S. PATENT DOCUMENTS

| 8,902,607 B1 * | 12/2014 | Chang ........................ G06F 1/16 |
| | | 361/679.01 |
| 2022/0113911 A1 * | 4/2022 | Kuriata ................. G06F 3/0659 |

OTHER PUBLICATIONS

Liu et al., "Microservices: architecture, container, and challenges", IEEE 20th International Conference on QRS-C, 2020 (Year: 2020).*
Docker Documentation, "Work with notifications", Downloaded from the Internet on Jan. 19, 2023, 10 pages. <https://docs.docker.com/registry/notifications>.
Docker, "What is a Container?", Downloaded from the Internet on Jan. 19, 2023, 10 pages. <https://www.docker.com/resources/what-container>.

(Continued)

*Primary Examiner* — Shi K Li
(74) *Attorney, Agent, or Firm* — Mannava & Kang, P.C.

(57) ABSTRACT

A test instrument provides field technicians with resources to support multiple aspects of network testing. The test instrument includes multiple, integrated and removably connectable modules such as a base module, a battery module and other modules that perform different tests on a network. Threads for a network test application can run on multiple modules of the test instrument. Containers are created on each of the modules to run the threads. An application name discovery and routing service (ANDR) is created in each of the containers. Also, an ANDR database is maintained by the ANDRs and the ANDR database identifies the container running each thread. The ANDRs route command and control messages between each other to utilize threads of the network test application running in other containers based on one or more of the entries in the ANDR database.

20 Claims, 15 Drawing Sheets

(56) References Cited

OTHER PUBLICATIONS

IBM Research Report, "An Updated Performance Comparison of Virtual Machines and Linux Containers", Year 2014, page. Downloaded from the Internet on Jan. 19, 2023. <https://dominoweb.draco.res.ibm.com/0929052195dd819c85257d2300681e7b.html?

Jerome Petazzoni, "Lightweight Virtualization with Linux Containers (LXC)", SCALE11x—Feb. 2013, Los Angeles, 51 pages. < https://www.socallinuxexpo.org/scale11x-supporting/defult/files/presentations/Jerome-Scale11x%20LXC%20Talk.pdf>.

Jesper Simonsson et al., "Observability and Chaos Engineering on System Calls for Containerized Applications in Docker", Jan. 29, 2021, 14 pages.

Jonathan Schipp et al., "ISLET: An Isolated, Scalable, & Lightweight Environment for Training", Proceedings of the 2015 XSEDE Conference: Scientific Advancements Enabled by Enhanced Cyberinfrastructure, Published Jul. 26, 2015, 6 pages.

Rami Rosen, "Linux Containers and the Future Cloud", Jun. 10, 2014, 85 pages. <http://www.haifux.org/lectures/320/netLec8_final.pdf>.

Rami Rosen, "Resource management: Linux kernel Namespaces and cgroups", Haifux, May 2013, 120 pages. <http://www.haifux.org/lectures/299/netLec7.pdf>.

\* cited by examiner

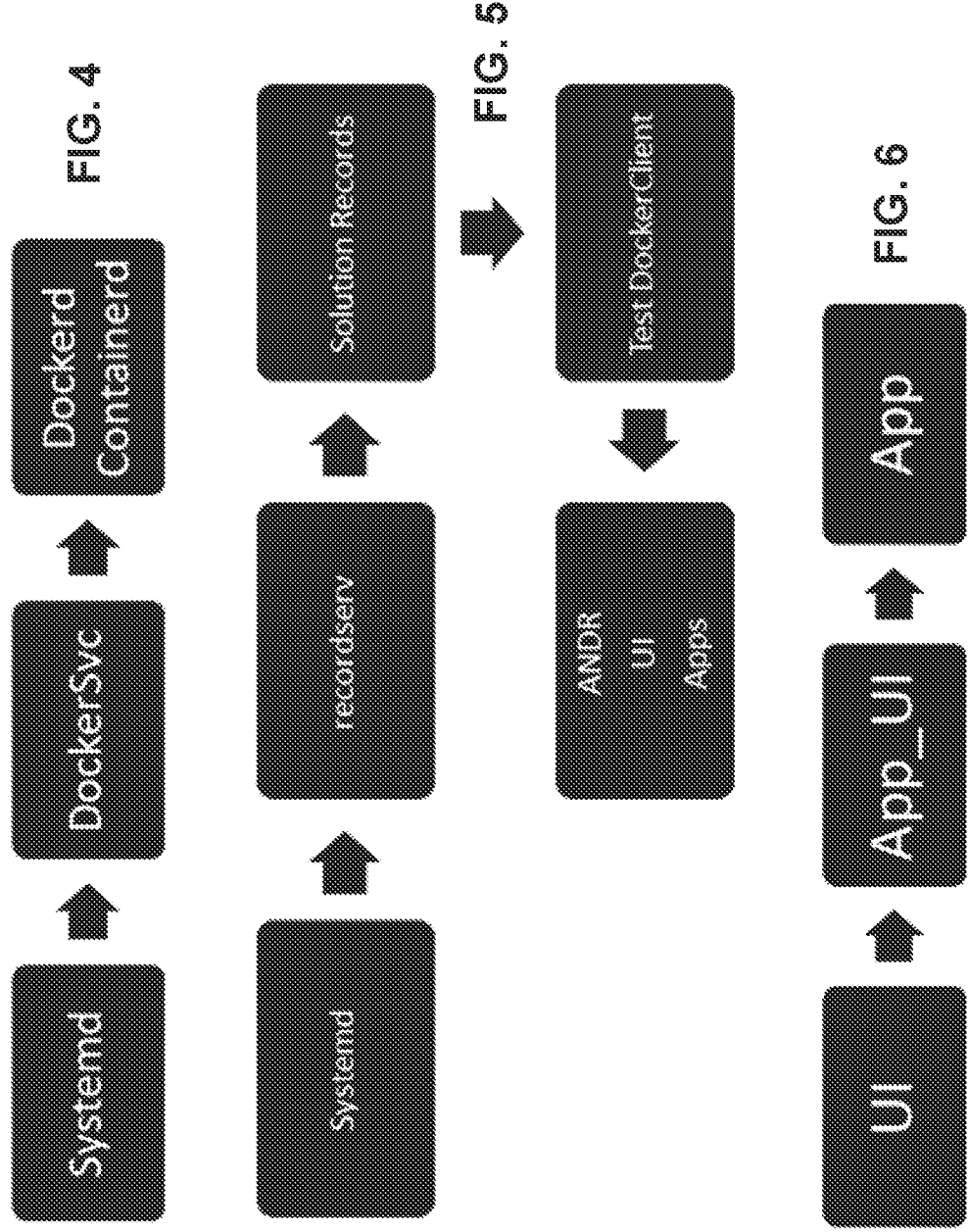

TEST MODULES FOR NETWORK TEST INSTRUMENT UTILIZING CONTAINERS

PRIORITY

The present patent application claims priority to U.S. provisional patent application Ser. No. 63/313,421 filed on Feb. 24, 2022, which is incorporated by reference in its entirety.

BACKGROUND

In a modern data center, there are thousands of links, cables, transponders, and connections, which can each be a potential point of failure. A few examples of test use cases for data center operators are described below and are grouped into external or internal test requirements.

An example of an external test use case relates to data center to data center interconnect (DCI). Due to the importance of the data stored in data centers, most data center operators (DCOs) back up data to yet another data center via high-capacity connections to ensure quick disaster recovery (DR). To maintain the integrity of those valuable connections and to verify service level agreements (SLAs), a DCO must perform tests on Ethernet line rates, e.g., up to 400 Gbps (400 G) or higher, as well as testing optical transport networking circuits, coarse wavelength division multiplexing (CWDM) circuits, and/or dense wavelength division multiplexing (DWDM) circuits. Data centers with 400 G Ethernet circuits employ a different modulation scheme (pulse amplitude modulation 4 level (PAM-4)) than lower line rates, and different transmission characteristics, and the testing has to accommodate these modulation schemes and new interfaces such as non-return-to-zero (NRZ) interfaces. Critical tests include industry-based: y Enhanced RFC-2544, Y.1564 SAM Complete and RFC-6349 True Speed. In addition, with such big and critical circuits connecting data centers, testing the underlying fiber integrity on those circuits is also prudent.

Another example of an external test use case relates to 200 G Data Center Interconnects (DCIs). To address ever growing data loads, many DCOs are using higher order modulation to create 200 G wavelengths over their DWDM systems, thereby doubling the capacity over the same fiber. While beneficial, the danger is not testing the system before adding live traffic to it. There may be limitations on a particular wavelength that prevent it from achieving a 200 Gbps transmission rate, and the limitations cannot be known without stress testing the wavelength before putting it into service. Many DCOs don't test these new 200 G links simply because they don't have the test capability. It's a challenge that extends from the data layer down to the optical transmission layer when validating optical signal to noise ratio (OSNR) and optimizing launch power levels to minimize bit error rates.

An example of an internal test use case relates to active optical cables (AOCs) and Direct Attach Copper (DAC). AOCs are widely used in DCs but they are difficult to test for errors because the optics are fused to each end. DAC are copper cables but pose the same testing challenge. When a link will not come up, many DCOs will replace an AOC hoping that it was the root of the problem without knowing for sure. AOCs are expensive and DCOs want to avoid mistakenly throwing away good AOC cables. AOC/DAC cables and breakout cables should be tested against transmission defects with a Bit Error Rate test.

Another example of an internal test use case relates to testing pluggable, optical transceiver modules which may be on the ends of the AOC cables. Quad Small Form-factor Pluggable units (QSFPs) and small form-factor pluggable units (SFPs) are examples of optical transceiver modules that connect to fiber-optic cables and may support up to 100 Gbps or higher optical transmission. These transceiver modules should be tested to ensure they are working optimally.

Conventional test instruments may not be able to perform all the tests needed to properly confirm operation of the thousands of links, cables, transponders, and connections, which can each be a potential point of failure, in a modern data center. As a result, DCOs often have to rely on many different test instruments and become familiar with the operation of the many different test instruments, or DCOs forego certain tests which can result in various DC failures and outages.

BRIEF DESCRIPTION OF THE DRAWINGS

Features of the present disclosure are illustrated by way of examples shown in the following figures. In the following figures, like numerals indicate like elements, in which:

FIG. 4 shows initialization of components of a container system, according to an example of the present disclosure;

FIG. 5 shows initialization of a network test application running in a container, according to an example of the present disclosure;

FIG. 6 shows a process when a network test is launched, according to an example of the present disclosure;

DETAILED DESCRIPTION

Figure 1:
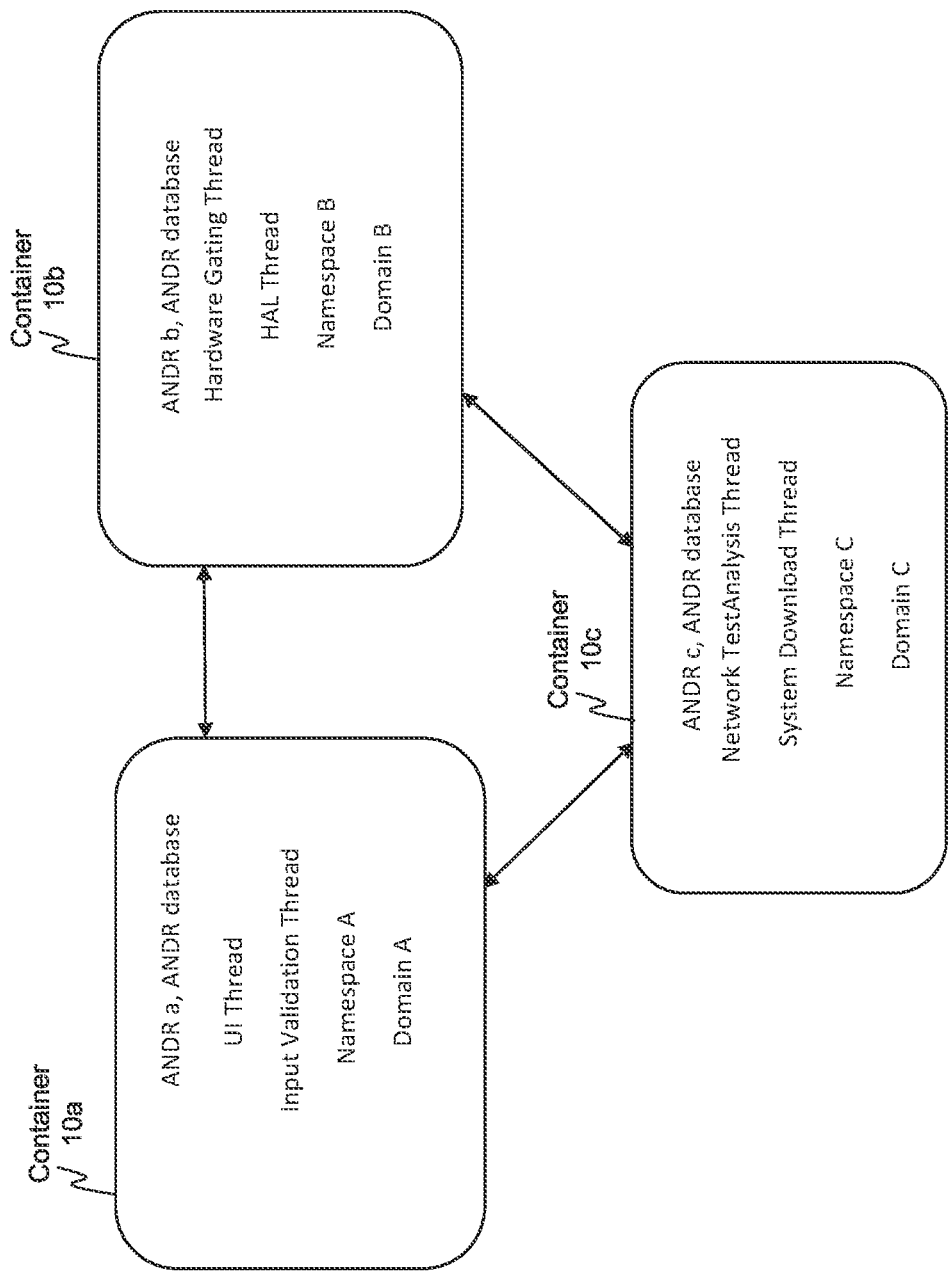
FIG. 1 shows a high-level architecture of containers, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to de at least one of a particular element. As used herein, the term "includes" means includes but not limited to, the term "including" means including but not limited to. The term "based on" means based at least in part on.

According to an example of the present disclosure, a test instrument provides field technicians with resources to support multiple aspects of installing and maintaining high-capacity networks, including 400 G networks. The test instrument includes interfaces to test fiber optic cables, QSFPs and SFPs, etc. The test instrument is also referred to as a network test instrument.

The test instrument may also be used for cell site testing, including testing for installation and maintenance of cell sites, and testing related to fiber optic cables (i.e., fiber) and optical signals, Radio Frequency (RF) signals, coaxial cables (i.e., coax) and antennas.

The test instrument provides multiple technical advantages over existing tools. The test instrument provides improved efficiency because it may replace multiple independent tools as well as provide additional measurements and insights that can improve installation and maintenance. In an example, the test instrument is modular, and different hardware modules can be added to the test instrument to provide different types of testing or to provide additional modules supporting multiple simultaneous tests that are the same. Thus, the test instrument is scalable, because modules can be added to accommodate new testing requirements.

Another technical advantage of the test instrument is that it can conserve hardware resources, including data storage, processing cycles, and input/output when multiple modules are connected to the test instrument. For example, the pluggable hardware modules may each run applications and threads. An application, also referred to as a network test application, is comprised of software, and is executable by hardware, including one or more processors and memories, of the test instrument. In an example, the test instrument includes a base module and/or pluggable modules connected to the base module, and each module having hardware resources including a processor and memory that can be used to run threads of the network test application. The pluggable modules may also be referred to as removable modules that are removably connected to the base module.

The network test application can be executed to perform a network test. Examples of network tests that can be performed by the test instrument are described below. Some nonlimiting examples include but are not limited to: an optics self-test for testing QSFP and SFP pluggables, high-speed cable testing for data centers, RFC 2544/Y.1564 testing, and optical transport network (OTN) testing. Also, the network testing may include tests performed by a 400 G module with PAM4 400 GE, 200 GE, 100 GE (no FEC or KR4 FEC), and 50 GE with SFP56 testing. A 100 G module supports independent dual tests for different protocols and for intermediate rates like 10 GE and 25 GE. An OTDR module can perform OTDR testing on fiber optic cables. Ethernet service activation testing includes: a QuickChek automated test that validates end-to-end configurations; a pre-check test for RFC 2544 or Y.1564; and a Y Enhanced RFC 2544 automated up test with for validating key performance indicators (KPIs), concurrently measuring throughput, frame delay, and frame delay variation in addition to frame loss and committed burst size (CBS). Optical spectrum analysis testing tests wavelength and power levels. One or more of these tests may be performed by one or more modules of the test instrument.

Conventionally, the pluggable modules may run one or more of the same applications and threads to perform various network tests, and each module duplicates the entire network test application, which can waste system resources and battery power. For example, the base module comprises a hardware accelerated network test module to perform customer network testing and analysis. Hardware acceleration may be provided by a field programmable gate array (FPGA) or other similar hardware acceleration circuit that performs network testing and analysis for a network test. The base module may also include processors and memory. The base module is controlled by several layers of software including the hardware abstraction layer, system software layer and application layer. The application layer may run multiple software threads, which are further discussed below. The pluggable modules of the test instrument may also be hardware accelerated network test modules, and run additional copies of each of the above-described software layers and threads. This increases the system resource usage including usage of a central processing unit (CPU), memory, I/O and power.

According to an example of the present disclosure, the test instrument can utilize threads for a network test application running on different modules of the test instrument instead of duplicating the threads on each module, which conserves system resources of the test instrument. The threads are executed in containers of each of the modules. A container is an operating system-level virtualization or application-level virtualization over multiple network resources so that software applications can run in isolated user spaces called containers in any cloud or non-cloud environment. Individually, each container simulates a different software application and runs isolated processes by bundling related configuration files, libraries, and dependencies, but, collectively multiple containers share a common operating system kernel. A container is a fully functional and portable cloud or non-cloud computing environment surrounding the application and keeping it independent from other parallelly running environments. Containers are isolated from one another and bundle their own software, libraries, and configuration files, but they can communicate with each other through defined protocols. Docker™ and Kubernetes™ are some examples of containers that may be used in the test instrument.

Each container includes a namespace. A namespace is a declarative region that provides a scope to the identifiers, e.g., the names of types, functions, variables, threads, or other objects inside it. A namespace is commonly used to uniquely identify one or more names from other similar names of different objects which may be in a different namespace. The namespaces provided by the containers can be used to isolate the software layers and application threads and at the same time allow re-use by leveraging the overlay file system provided by the container to maintain a single image of the software in memory but use them in different containers.

In order to maintain a single image of the software for the test application in memory but use the threads for the network test application in different containers, an application name discovery and routing service (ANDR) is executed in each of these containers. An ANDR comprises code running in a container that performs various function described below, including application and thread registration, and command and control operations for instructing threads in different containers to perform operations for the network test application. The ANDRs can route command and control messages between various application threads running in different containers to perform operations of the network test application. Each ANDR maintains an ANDR database of applications and threads that are running inside each of the different containers, so each ANDR is aware of the applications and threads running in its container and other containers. The applications and threads are registered with the ANDRs using a unique ID, e.g., referred to as a domain. In an example, the unique ID is randomized and generated based on a network interface media access control (MAC) address. The ANDRs running inside the containers discover each other using an ANDR discovery protocol at container startup. The application threads running in each container can then communicate with each other by appending the domain, such as application@domain, as the destination address in the command and control messages thus enabling automatic distributed and scalable processing of multiple hardware modules connected to the test instrument. By using the containers, the ANDRs and the ANDR databases, the test instrument can utilize threads of a network application running in different containers so each module does not need to load and execute separate instances of the entire test application. This reduces the system resource usage including processing, memory, I/O and power.

A container with an ANDR can be launched on a base module, and a container with an ANDR can be launched on each pluggable hardware test module connected to the test instrument. In an example, to launch a container, a container daemon is launched as a host process, which may be in response to normal operating system bootup. The container client can then be launched to create a container image on the module. When the container is launched, it spawns the ANDR and other application processes inside the container. The ANDR discovery and routing mechanism is also enabled which allows the routing of messages between applications in each of the namespaces as the networking is namespace constrained to the specific container.

When a network test is launched on a module, it may require execution of one or more network test applications and/or threads. The following describes by way of example a general flow of events, including threads that are launched, when a network test application is launched on a module. A User Interface (UI) thread renders a UI to collect test input parameters. An Input Validation thread validates the input. A Hardware Gating thread gates the input based on an event and/or an interrupt from a Hardware Abstraction Layer (HAL) thread. The HAL thread maintains a database of hardware events and communicates with the hardware. A Network Test and Analysis thread uses the input parameters to generate test templates. A System Download thread transfers the test templates to the hardware. A Latching thread periodically latches the results generated by the hardware. A Results Analysis thread performs the required analysis on the generated results. A Results Generation thread generates the results in the form of graphs, tables, and other formats. A Results Presentation thread renders the results in the UI. The above-described threads and workflow of events are generic and applicable to multiple different tests that can be run by the test instrument.

FIG. 1 shows, by way of example, a high-level architecture of containers 10a-c including ANDRs a-c, threads, namespaces and domains, which may be provided in one or modules of a test instrument 100. The containers 10a-c may be hosted on different modules, e.g., a base module and/or one or more pluggable modules, of the test instrument 100. ANDRs a-c are executed in containers 10a-c, respectively. Each container has its own namespace, shown as namespaces A-C, and its own domain, shown as domains A-C. ANDRs a-c maintain communication with each other.

The threads discussed above are for a network test application. One or more of the threads running in different containers may be used by multiple instances of the same network test application running on one or modules of the test instrument 100. A possible but not a complete distribution of the threads discussed above is shown in FIG. 1. For example, the UI Thread and Input Validation Thread are in Domain A; the Hardware Gating Thread and HAL Thread are in Domain B; and the Network Test Analysis Thread and System Download Thread are in Domain C. Each of these threads run the applications with the same name, and each of the applications in each of the domains registers with the ANDR in their domain, and the registered application information is shared among ANDRs in different domains as is further discussed below.

Each of the ANDRs a-c maintains an ANDR database that keeps track of the applications and threads running in the different containers and domains on the modules of the test instrument 100. An example ANDR database format is as follows:

| Test Application XXX | Domain |
| --- | --- |
| UI Thread | A |
| Input Validation Thread | A |
| Hardware Gating Thread | B |
| HAL Thread | B |
| Network Test Analysis Thread | C |
| System Download Thread | C |

Figure 3:
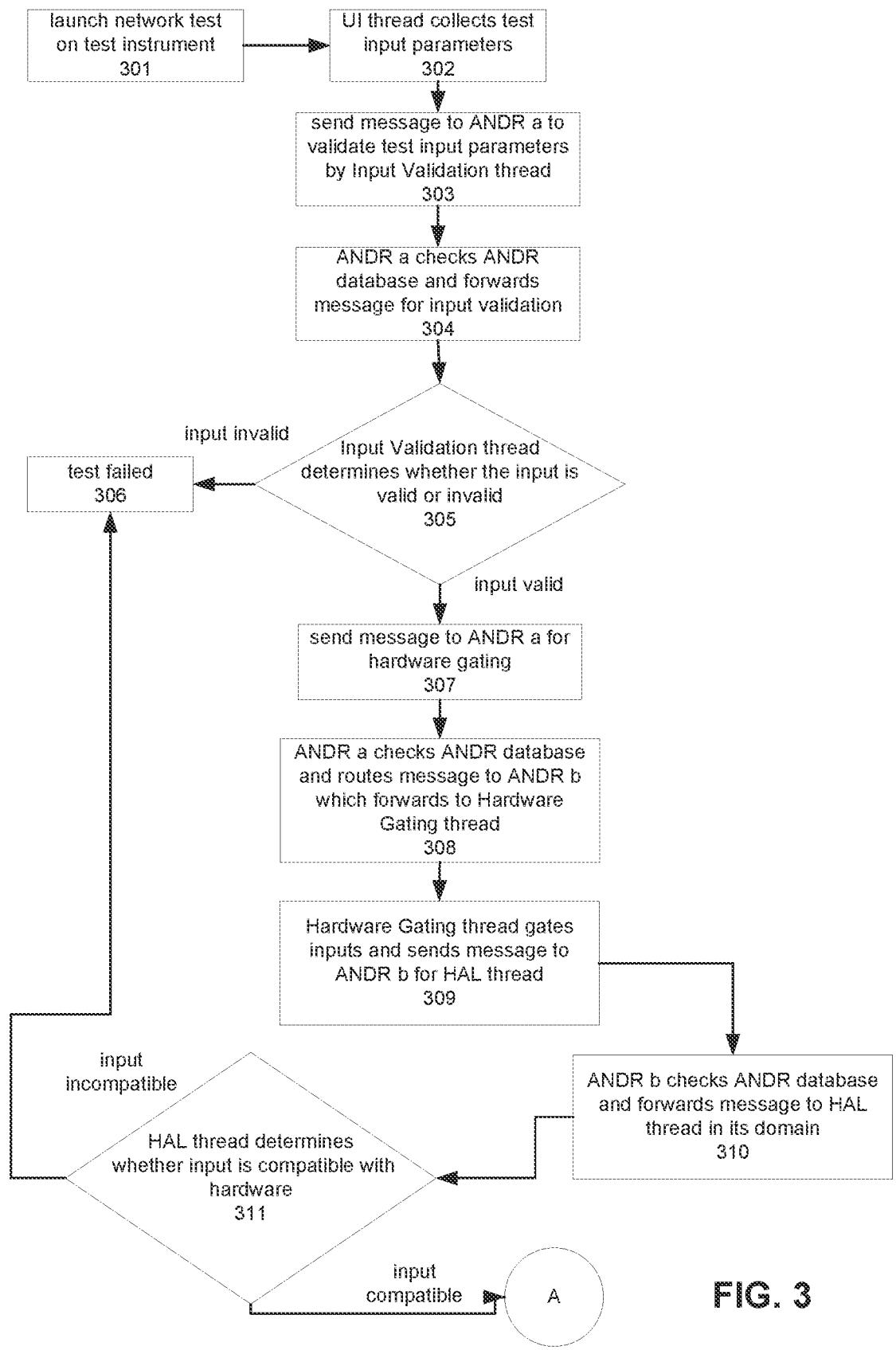
FIG. 3 shows a flowchart for running a network test on the test instrument and describes the messages exchanged to run the network test, according to an example of the present disclosure.
Figure 3:
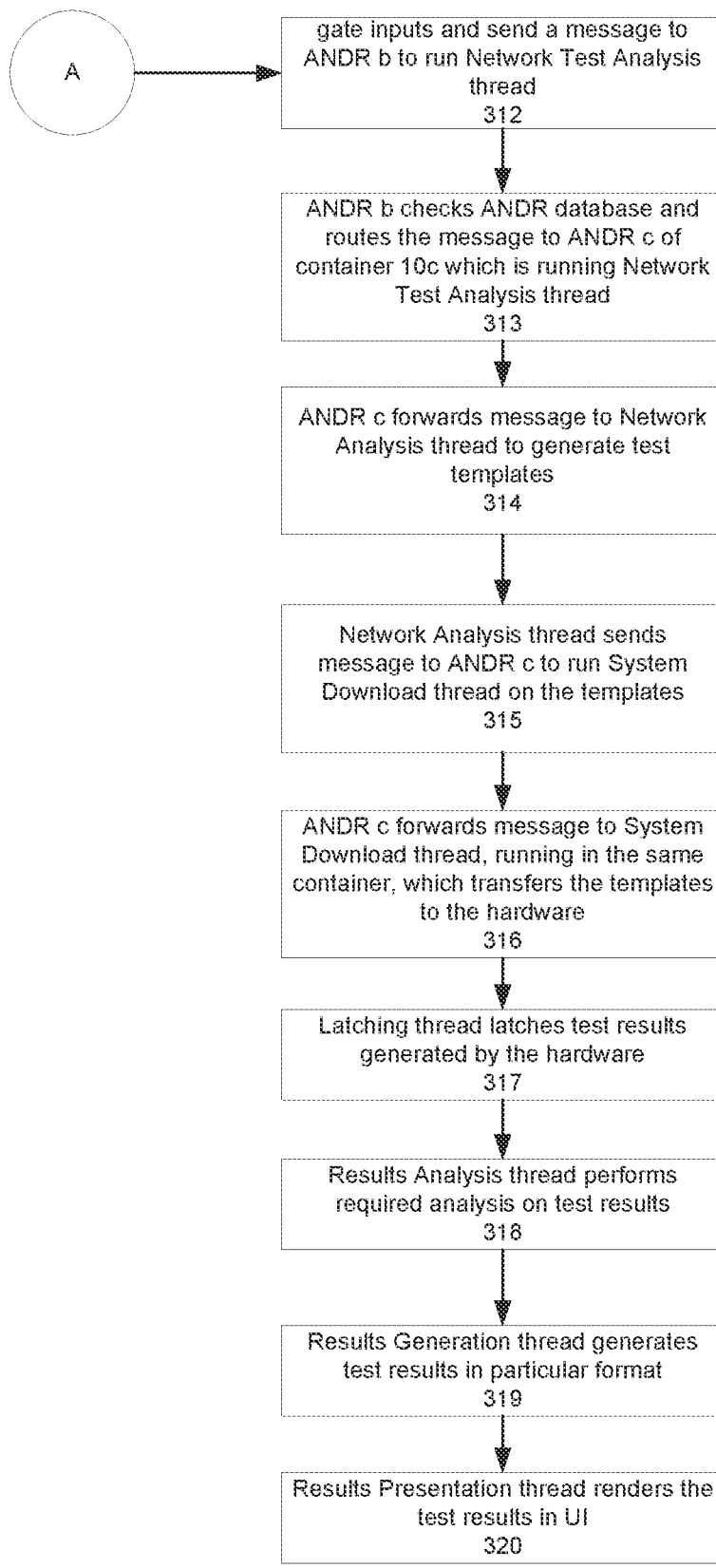

In this example, test application XXX is comprised of the threads shown above which happen to be running in domains A-C in containers 10a-c. The ANDR database keeps track of which domains are executing which threads of the application. The ANDR database is searched to determine if a thread needed for an application is already running in a different domain, and the ANDR to an ANDR of another domain to utilize a thread running in the other domain. For example, as shown in FIG. 3 as is further described below, ANDR a checks the ANDR database to determine that another ANDR, i.e., ANDR b, is running the Hardware Gating Thread, and sends a command and control message to ANDR b which is forwarded by ANDR b to the Hardware Gating Thread to gate the hardware. Accordingly, the module running the threads in domain A does not need to launch the Hardware Gating Thread, which conserves hardware resources, including CPU cycles, memory, and battery power.

An ANDR message format is used for messages communicated between the ANDRs a-c. The ANDR message format includes the following fields: Unique Message ID; Source Application name registering with ANDR; ANDR name; Message type which could be cmd, async, or ack; and Message name which could be register, unregister, or app_connected. The ANDR message format is as follows, whereby the message fields are delimited by colons: MessageId:application-name:andr-name:message-type:message-name.

Figure 2:
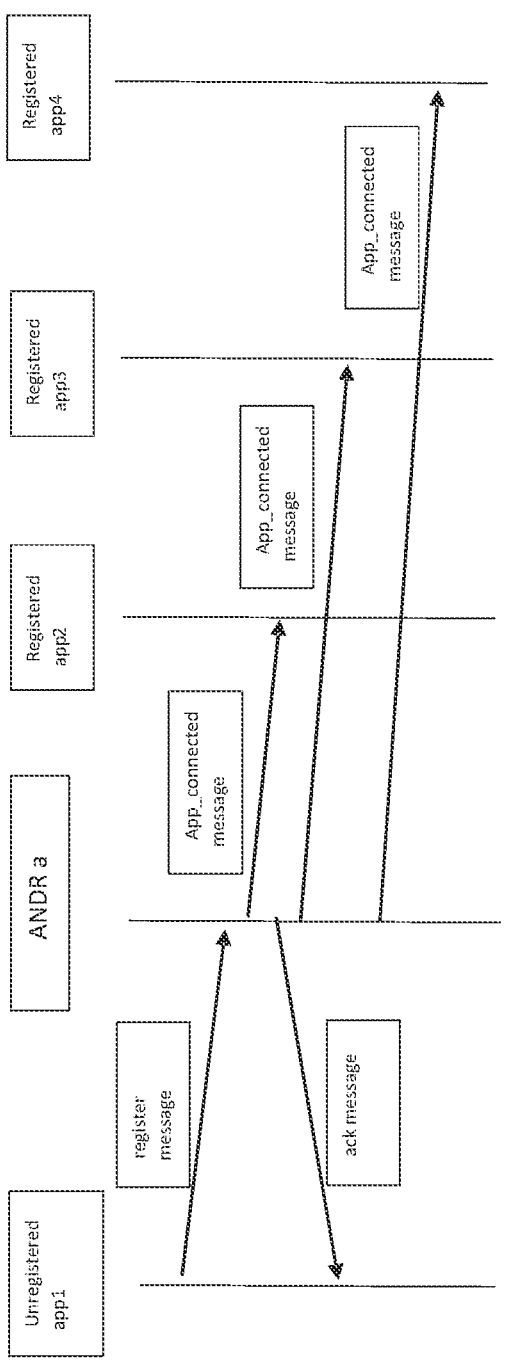
FIG. 2 shows a protocol that is followed to register a network test application, according to an example of the present disclosure.

An ANDR, such as each of ANDRs a-c, follow an application registration protocol to register the applications and threads running in the domain with the ANDR running in that domain. Then, the ANDRs can store the registration information in the ANDR database and share the information between the ANDRs, so each ANDR is aware of the applications and threads running in each domain. FIG. 2 shows the protocol that is followed to register an application, e.g. app1, running in Domain A with ANDR a. The protocol shown in FIG. 2 is as described below.

Unregistered app1 sends a register message to ANDR a in its domain. The message format is 23:app1:andrA:cmd:register. ANDR a sends ack message back to app1. The message format is 23:andrA:app1:ack:register. ANDR a sends app_connected async message to all the already registered applications, such as apps 1-4. The message formats for the async messages are 0:andrA:app2:async:app_connected app1; 0:andrA:app3:async:app_connected app1; and 0:andrA:app4:async:app_connected app1. Then, ANDR a shares the information for registered app1 with all the other ANRDs b-c. The shared information may include the registered application and the threads that are running for the registered application, if any, in the domain.

FIG. 3 shows a flowchart for launching a network test application for a network test, and describes command and control messages exchanged between ANDRs in different domains to run threads in different containers for the network test application. The command and control messages may include data to be operated on by a particular thread, such as user input to be validated or test parameters to be validated for hardware gating, etc. As shown in FIG. 3, an ANDR can check the ANDR database in its domain to determine if any other domains are running a thread that is needed to execute the test based on entries in the ANDR database if its domain is not running the thread. If so, the ANDR sends a command and control message to the appropriate ANDR in a different domain with input parameters. Then, the ANDR in the different domain receives the command and control message with input parameters and passes the input parameters to the thread in its domain to perform a function to execute the test. FIG. 3 is described below with respect to the example in FIG. 1 where the UI Thread and the Input Validation Thread are running in Domain A, the Hardware Gating Thread and HAL Thread are running in Domain B; and the Network Test Analysis Thread and the System Download Thread are running in Domain C. One or more of the messages described below with respect to FIG. 3 may be command and control messages, including the messages transmitted between ANDRs. Also, in an example, the test instrument 100 may have multiple modules running the same network test application. Instead of duplicating the network test application on both modules, a single instance of the network test application is distributed across containers, and the ANDRs exchange command and control messages to utilize the threads in the different containers.

Referring to FIG. 3, at 301, a network test is launched on the test instrument 100. This may include a user selecting a test on the test instrument 100 to run. In an example, the test may be selected via a display or other interface on a base module but may be executed using a pluggable module and/or the base module. For example, the test may be a 400 Gigabit Ethernet (GbE) layer 1 optics test that can test 400 G circuits and QSFPs. Other examples of tests may include OTDR, an RFC 2544/Y.1564 service activation test, and OTN test and other tests described herein. The network test application for the network test is launched in a container, such as container 10a, and container 10a includes the threads discussed above with respect to FIG. 1. In this example, container 10a includes the UI thread and the Input Validation thread as shown in FIG. 1.

At 302, the UI thread collects test input parameters. For example, assume the 400 Gigabit Ethernet (GbE) optics self test is selected to test a QSFP. Test configuration settings are input into the test instrument 100, for example, by the user. For example, test duration, a FEC type (e.g., Reed-Solomon), a bit error rate (BER) type (e.g., pre-FEC or post-FEC) and a BER threshold are examples of configuration settings for 400 GbE QFSP testing. This information is collected and stored by the UI thread.

At 303, the UI thread sends a message to ANDR a to validate the test input parameters by the Input Validation thread. At 304, ANDR a checks the ANDR database in its domain, and determines an Input Validation thread is running in its domain in container 10a, and ANDR a forwards the message to the Input Validation thread in container 10a. At 305, the Input Validation thread determines whether the test input parameters are valid or invalid. For example, Reed-Solomon is the proper FEC type for 400 GbE testing but if another FEC type is entered as a configuration setting, it can be rejected by the Input Validation thread.

At 306, if the test input parameters, e.g., the configuration settings, are determined to be invalid, the test is indicated as failed. At 307, if the input is determined to be valid, the Input Validation thread sends a message to ANDR a for hardware gating by a Hardware Gating thread.

In the next steps, the Hardware Gating thread and the HAL thread check if the test input parameters are compatible with the hardware, such as an FPGA, to perform the test and that the hardware is in the proper state to run the test. At 308, ANDR a checks the ANDR database to determine if the Hardware Gating thread is running in a different domain, and routes the message to ANDR b. For example, ANDR a determines the Hardware Gating thread is running in domain B of container 10b, and ANDR a routes the message to ANDR b, which forwards the message to the Hardware Gating thread running in container 10b.

At 309, the Hardware Gating thread gates the test parameter inputs and sends a message to ANDR b with the inputs to check with the HAL thread to determine whether the input is compatible with the hardware. At 310, ANDR b checks the ANDR database in its domain, and determines the HAL thread is running in its domain in container 10b, and forwards the message to the HAL thread in container 10b. At 311, the HAL thread determines if the input is compatible with the hardware. For example, the HAL thread determines whether the FPGA is compatible with a particular byte test pattern or determines whether the FPGA is configured to run the test.

If the input is determined to be incompatible, the test is indicated as failed (step 306). At 312, if the input is determined to be compatible, the Hardware Gating thread gates the inputs with the hardware, and sends a message to ANDR b to run a Network Test Analysis thread. At 313, ANDR b checks the ANDR database and determines the Network Test Analysis thread is running in domain c (container 10c), and routes the message to ANDR c. At 314, ANDR c forwards the message to the Network Test Analysis thread is running in container 10c and uses the input parameters to generate test templates.

At 315, the Network Test Analysis thread sends a message to ANDR c to run a System Download thread on the templates. At 316, ANDR c forwards the message to the System Download thread running in the same container 10c, and the System Download thread transfers the test templates to the hardware.

At 317, a Latching thread periodically latches the test results generated by the hardware. The test results are stored in memory. At 318, a Results Analysis thread performs the required analysis on the generated results. Examples of test results may include pass or fail for signal presence, optical signal level and whether a bit error rate exceeds a threshold. Also, optical power levels for transmitting and receiving can be determined. At 319, a Results Generation thread generates the results, which may include graphs, tables, and other formats. At 320, a Results Presentation thread renders the results in the UI of the test instrument 100. Although not described, steps 317-319 include steps where an ANDR forwards a message to a thread in its container or the ANDR routes the message to an ANDR in another container similar as described above with respect to previous steps.

In general, as is described above, each ANDR checks its ANDR database to determine whether a needed thread is running in its container or another container. If the needed thread is running in its container, the ANDR forwards a message, which may include data inputs, to the thread in its container (i.e., the current container). If the needed thread is running in a different container, the ANDR forwards the message to the ANDR of the other container that is running the thread, so the thread does not need to be duplicated in the current container. If a thread is determined not to be running in the current container of the ANDR and not to be running in a different container, then the thread is spawned in the current container or another container, which may be based on resource usage.

FIG. 4 shows the initialization of the components of the ANDR by systemd, and FIG. 5 shows the initialization of a Docker™ client for running a network test application running inside a Docker™ container. Docker™ is one example of a type of container that may be used by the test instrument 100. Other types of containers may be used in the test instrument 100. In FIG. 4, the Docker™ container daemon which provides the runtime, Docker™ socket and shim service layer for Docker™ is launched by running the dockerd containerd with parameters. Then, the Docker™ daemon is provided by launching the dockerd containerd. FIG. 5 shows the initialization of the network test application running inside a Docker™ container. Systemd launches the recordserv service. As part of this, a script is run, which reads solution records. If it finds the requisite record, it launches the Docker™ client with the Docker™ image containing the network test application. The network test application running inside the Docker™ client includes the ANDR. UI and other embedded applications are launched which communicate with the module hardware to run the network test application based on the configuration provided and provides the test results.

FIG. 6 shows a sequence when a network test application is launched on the test instrument 100, such as by a user selecting, through a UI, a test to be performed by the test instrument 100. The test application for the test running inside the container communicates with the various threads to launch the test application based on resource availability. As part of this, the hardware files are downloaded into the module hardware and the test configuration is specified so that the test can be launched based on the specified configuration. As the hardware latches the results, they are read by the application and displayed to the user.

Figure 7:
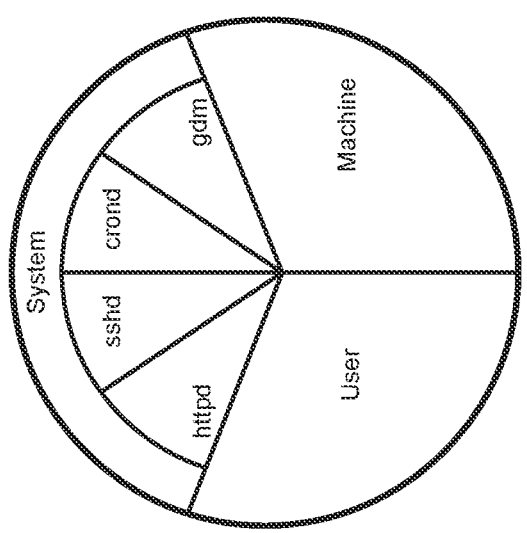
FIG. 7 shows control groups, according to an example of the present disclosure.

FIG. 7 illustrates a control groups (cgroups) hierarchy for a CPU, memory, and block I/O that can be used for the containers, and which are in one or more of the modules of the test instrument 100 Cgroups, are an operating system, e.g., Linux, kernel feature which allow processes to be organized into hierarchical groups whose usage of various types of resources can then be limited and monitored. The kernel's cgroup interface is provided through a pseudo-filesystem called cgroupfs. Grouping is implemented in the core cgroup kernel code, while resource tracking and limits are implemented in a set of per-resource-type subsystems (memory, CPU, and so on). A cgroup is a collection of processes that are bound to a set of limits or parameters defined via the cgroup filesystem. A subsystem is a kernel component that modifies the behavior of the processes in a cgroup. Various subsystems have been implemented, making it possible to do things such as limiting the amount of CPU time and memory available to a cgroup, accounting for the CPU time used by a cgroup, and freezing and resuming execution of the processes in a cgroup. Subsystems are sometimes also known as resource controllers (or simply, controllers).

The cgroups for a controller are arranged in a hierarchy. This hierarchy is defined by creating, removing, and renaming subdirectories within the cgroup filesystem. At each level of the hierarchy, attributes (e.g., limits) can be defined. The limits, control, and accounting provided by cgroups generally have effect throughout the subhierarchy underneath the cgroup where the attributes are defined. Thus, for example, the limits placed on a cgroup at a higher level in the hierarchy cannot be exceeded by descendant cgroups.

The pie chart shown in FIG. 7 shows the three cgroups on a Linux machine. The three cgroups are System, User and Machine. Each of these cgroups is also known as a "slice". A slice can have child slices, as is seen by the System slice in the diagram. All of these slices always add up to 100% of the total resources for a specific controller (CPU, Memory, etc.).

As shown the three top level slices (system, user and machine) are each granted equal CPU time with each other but this only happens once the system ends up under load. If a single process in the User slice wants 100% and nothing else does, this process will be granted that CPU time.

The three top level slices (system, user and machine) all have specific workloads that end up as sub-slices. System is where daemons and services are placed. User is where user sessions are placed. Each user gets a single slice under the main group. This prevents stealing of resources than they are allowed. Machine is the hardware.

One method of controlling resource usage is with the concept of "shares". Shares are a relative value and the actual numbers only matter when compared to other values in the same cgroup. By default, slices are set to a value of 1024. So, in the system slice discussed above, httpd, sshd, crond and gdm are each set to use 1024 CPU shares. System, User and Machine are each set to 1024 themselves.

Figure 8:
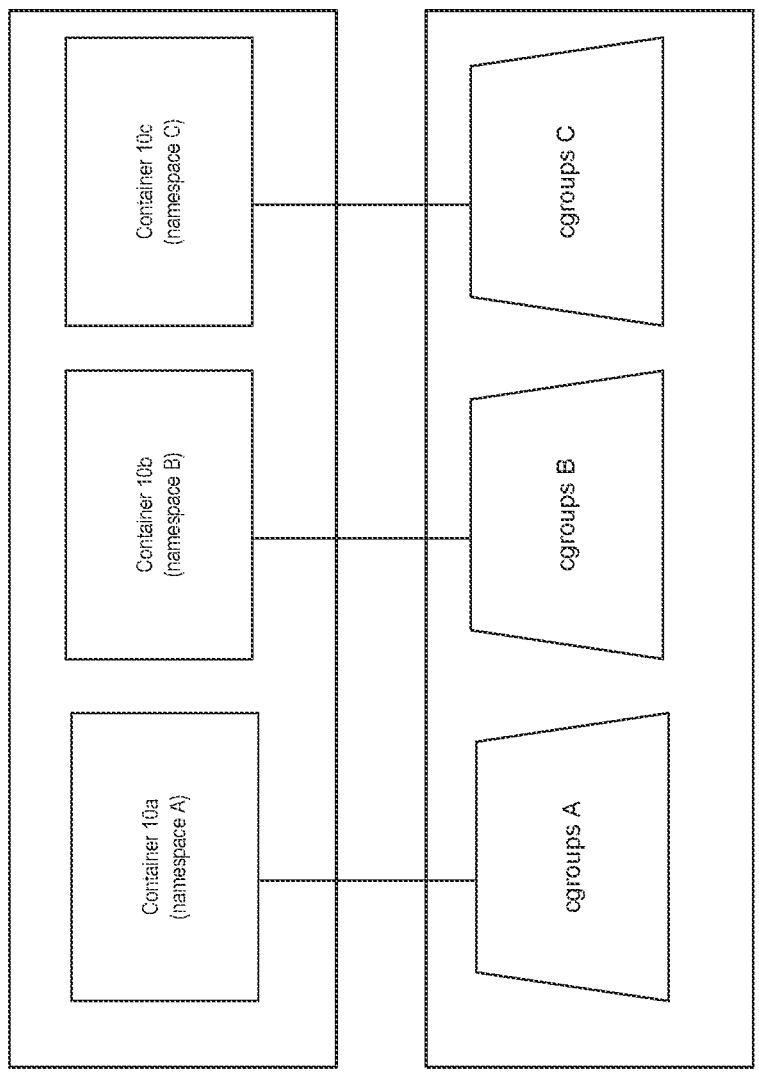
FIG. 8 shows that a container may be a combination of namespaces and control groups, according to an example of the present disclosure.

FIG. 8 shows that a container may be a combination of namespaces and control groups.

Figure 9:
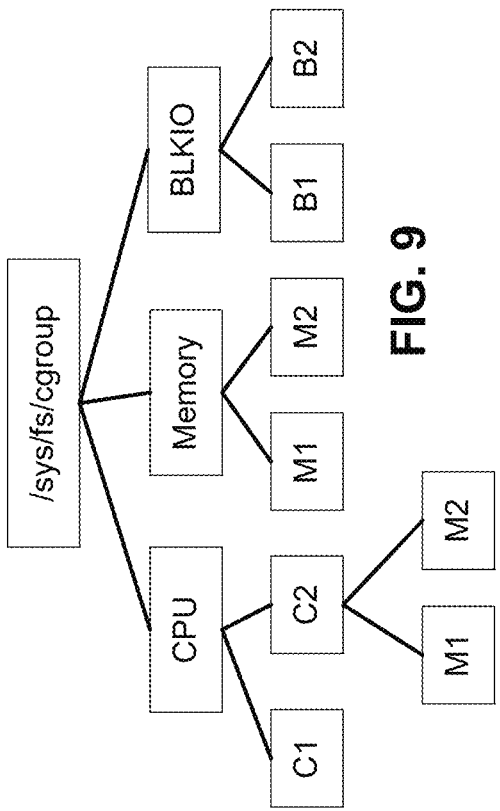
FIG. 9 shows a control group for a container can be used to control particular hardware resources, according to an example of the present disclosure.

FIG. 9 shows that a cgroup for a container can be used to control usage of CPU, memory, and block I/O.

Figure 10:
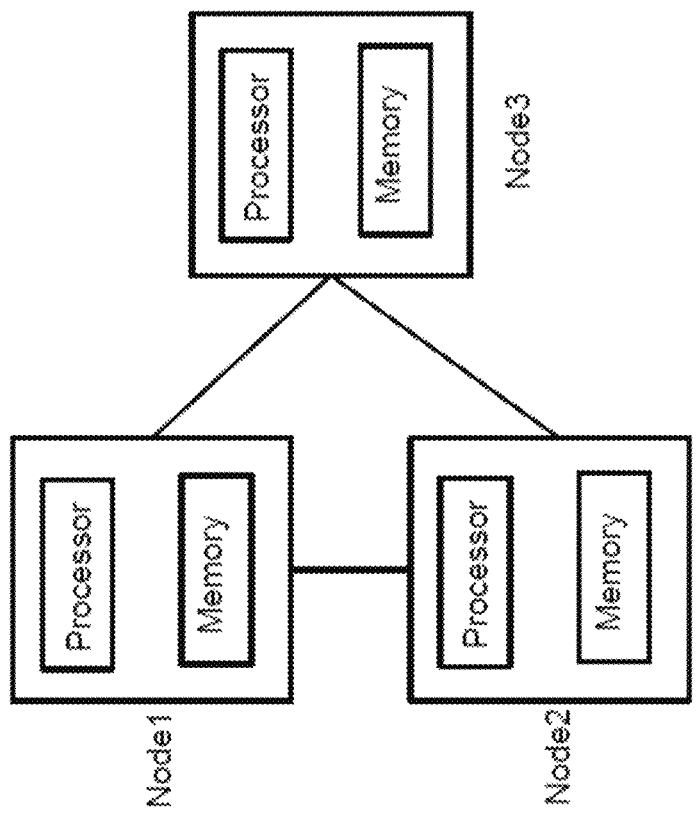
FIG. 10 shows a multi-core distributed service architecture, according to an example of the present disclosure.
Figure 11:
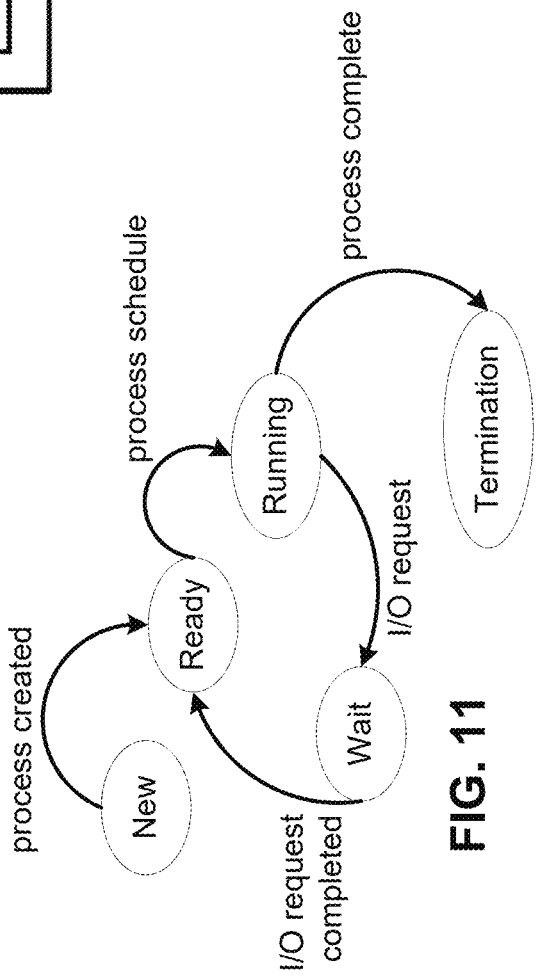
FIG. 11 shows a service state flow, according to an example of the present disclosure.

Containers can run on a distributed service architecture. A multi-core distributed service architecture is illustrated in FIG. 10. Each Node is a core of a multi-core processor. The processes and threads in the system are distributed across the different cores based on standard scheduling policies which doesn't normally consider the specific requirements of the services. The service state flow for creating, scheduling and terminating a process is illustrated in FIG. 11. By grouping related threads of a service into a control group using containers the I-cache and D-cache performance can be increased by leveraging spatial and temporal coherence.

As was mentioned above, the test instrument 100 may be comprised of multiple modules that allows it to scale to accommodate new testing requirements as needed. A module comprises hardware including a processing circuit (also referred to as a processor) and memory, and software can be loaded on the module. One or more of the modules may be removably connected to the test instrument 100. A module may include a hardware-based acceleration module for performing network test operations. The hardware-based acceleration module may include a FPGA or some other type of processing circuit to perform network testing functions. An example of a module is a 400 G module with PAM-4 400 G, 200 G, 100 G testing.

A description is now provided of some examples of modules for the test instrument 100 that can perform various tests. According to an example, the test instrument 100 may include various removably connectable Solution Modules, various removably connectable Expansion Modules, and various integrated modules that may be factory installed. According to an example, the test instrument 100 may include a Base Module to provide core processing functionality. The test instrument 100 may also include other modules, such as a 400 G module, a User Interface Module, a Battery Module to supply portable power, and other modules that are further discussed below. Examples of the modules are described below but the test instrument 100 is not limited to those modules.

The test instrument 100 may include a Base Module, to support a common platform. The Base Module includes interfaces ready to connect to various other Solution Modules and/or Expansion Modules as needed to provide the ability to perform desired tests. The Base Module may communicate with a synchronizing server or workstation to automatically obtain configuration settings, software options, updates, and registration.

The test instrument 100 may include a pluggable 400 G module and/or a pluggable 100 G module. The 400 G module can perform PAM-4 400 G, 200 G, 100 G testing. The 100 G module supports independent dual tests for any protocol from T1/E1 to OTU4 including intermediate rates like 10 G and 25 G rates. The modules may be stacked. For example, multiple 400 G modules can be connected to the base module to test a plurality of 400 G circuits simultaneously.

The test instrument 100 may include a module for performing fiber inspection and testing. Standards bodies have established acceptance criteria for the quality and cleanliness of fiber and fiber connector end faces. Fiber inspection probes and fiber optic inspection scopes are required to maintain fiber in accordance with these standards and specifications. For example, a single particle mated into the core of a fiber can cause significant back reflection, insertion loss, and equipment damage. Contaminated or "dirty" fiber is a cause of fiber optic network degradation. As a result, proactive fiber optic inspection programs support the deployment of large-scale fiber optic network and fiber optic testing initiatives to ensure reliable, high-quality, high-speed, and high-capacity broadband services. Fiber inspection probes and fiber optic inspection scopes (also known as fiber microscopes) integrate with the test instrument to determine the cleanliness of fiber connections during network installation.

Industry associations maintain guidance for fiber optic inspection and fiber optic cleaning practices and procedures, including BISCI and the Fiber Optic Association. BICSI is a professional association supporting the advancement of the information and communications technology profession. The Fiber Optic Association is an international society of professionals that creates industry standards for training and certifying fiber optic technicians. The International Electrotechnical Commission (IEC) created IEC 61300-3-35, which specifies Pass/Fail requirements for connector end-face quality and network performance throughout the fiber optic life cycle.

The test instrument 100 may include a module for performing QSFP and SFP Monitoring. QSFPs are Quad Small Form-factor Pluggable units that support optics functionality. QSFPs are available in different variants, covering a wide range of applications, and include: SR-4, LR-4, etc.; 4×10 G (QSFP+) or 4×25 G (QSFP28).

The test instrument 100 may include a removably connectable OTDR Module for optical time domain reflectometer testing. OTDR testing is fiber optic testing for the characterization of optical networks that support telecommunications. The purpose of OTDR testing is to detect, locate, and measure elements at any location on a fiber optic link. An OTDR Module may require access to only one end of a link and acts like a one-dimensional radar system. By providing pictorial trace signatures of the fibers under test, it is possible to obtain a graphical representation of an entire fiber optic link. In other words, the OTDR Module creates a virtual "picture" of a fiber optic cable route. The analyzed data can provide insight into the integrity of the fibers, as well as any passive optical component such as the connectors, splices, splitters, and multiplexers along the cable path. The data can be recalled as needed to evaluate the degradation of the same cable over time. The OTDR module is capable of troubleshooting fiber optic cable failures by locating a distance to fault (DTF) and identifying the type of fault, such as breaks, bends, bad connectors, and portions having excessive loss.

The OTDR module injects pulsed light energy (pulsed optical power), generated by a laser diode, into one end of an optical fiber. A photodiode measures over time the returning light energy or optical power (reflected and scattered back) and converts it into an electrical value. Once amplified and sampled, the value may be graphically displayed on a screen. The OTDR Module measures and shows the location and loss of passive optical network elements which are called OTDR trace "events". The location or distance to each event is calculated from the round-trip time of the light pulse traveling along the fiber. The loss is calculated from the amplitude value of the returned signal or optical power (also known as a backscattering effect).

The test instrument 100 may include a removably connectable Optical Spectrum Analyzer (OSA) Module for optical spectrum analyzer testing by way of a coarse wavelength division multiplexer (CWDM) analyzer. Historically, large and expensive optical spectrum analyzers (OSA) were used to precisely test wavelength and power levels in CWDM networks, and optical channel checkers were used to verify optical channel presence. The OSA Module offers the functionality and speed of a conventional OSA in a handheld form factor.

Fiber optic cable lengths may be measured in kilometers with varying equipment along a backhaul signal path. The International Telecommunication Union Telecommunication Standardization Sector (ITU-T) coordinates standards for telecommunications. ITU-T G.695 specifies transmitter/multiplexer characteristics at one end of a CWDM link and de-multiplexer/receiver characteristics at the other end. ITU-T G694.2 specifies a spectral grid for CWDM applications with 18 channels from 1271 to 1611 nm, with 20 nm channel spacing. The OSA Module may verify optical interface parameters according to the above standards, such as Tx output power, Rx input power, and central wavelengths.

In CWDM networks, transmitter lasers are typically not equipped with a cooling system, thus temperature variations can cause a drift of the central wavelength and the power level. The OSA Module can verify possible wavelength shifts or power loss. Transmitters with a wavelength offset can create additional attenuation in the multiplexers and de-multiplexers. When test access points are available, the OSA Module may determine a wavelength's presence and its associated power level to verify that all transmitted wavelengths have been correctly multiplexed without excess power loss on one of the channels. A wavelength drift in a transmitter can create power drift which may cause bit errors. The OSA Module may monitor and record the evolution of channel power and wavelength over time. The OSA Module may include Small Form-factor Pluggable (SFP) transceivers to test a link between a head end and a tail end when a system transceiver is unavailable.

The test instrument 100 may include a battery module and other modules for performing network testing and/or cell site installation tests.

Figure 12A:
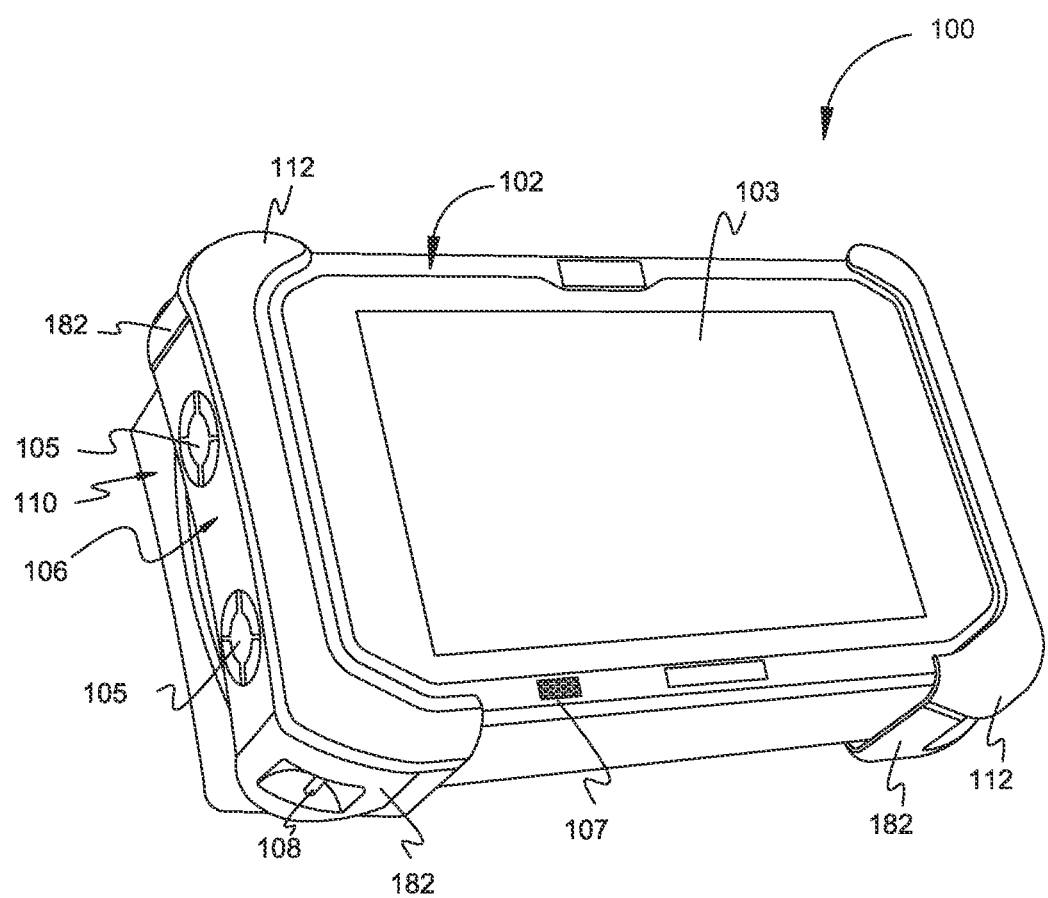
FIG. 12A illustrates a perspective view of a test instrument including a base module and an input/output (I/O) device, according to an example of the present disclosure.

FIG. 12A illustrates a perspective view of test instrument 100 including Base Module 106 and I/O device 102 (which may be removably connected), according to an example of the present disclosure. Test instrument 100 may be a modular hand-held tool comprising removably connectable field replaceable Modules for cell site installation, testing, measurement, and maintenance. According to an example, test instrument 100 includes removably connectable I/O device 102, and a removably connectable Base Module 106. According to an example, I/O device 102 includes a display 103 that provides user control and information. According to an example, display 103 may be a touch screen, e.g., liquid crystal display (LCD) touchscreen. The test instrument 100 provides user information including: a listing of jobs, a listing of reports to be compiled, a compilation of executed test results in a test report or test reports, and an interface control with a work station or server, described in greater detail below. Base Module 106 provides hardware, software and firmware, described in greater detail below, to control test instrument 100.

According to the illustrated example of FIG. 12A, ventilation ports 105 are provided to the outer structure of Base Module 106 to facilitate internal cooling of components by way of an internal cooling unit. Loudspeaker 107 provides audio information. Base Module 106 provides a structural base for test instrument 100, and includes support structures 108 for attachment of a support strap (not shown). According to an example, support structures 108 are metal pins permanently secured to the structure of Base Module 106. I/O device 102 includes elastomeric bumpers 112 to provide impact protection. Likewise, Base Module 106 includes elastomeric members 182 which may act as bumpers.

According to an example, test instrument 100 may be configured in a variety of assemblies with a plurality of different removably connectable Modules to support workflow and project specifications. According to the illustrated example of FIG. 12A, test instrument 100 includes first expansion module 110 removably connected to the bottom of Base Module 106.

Figure 12B:
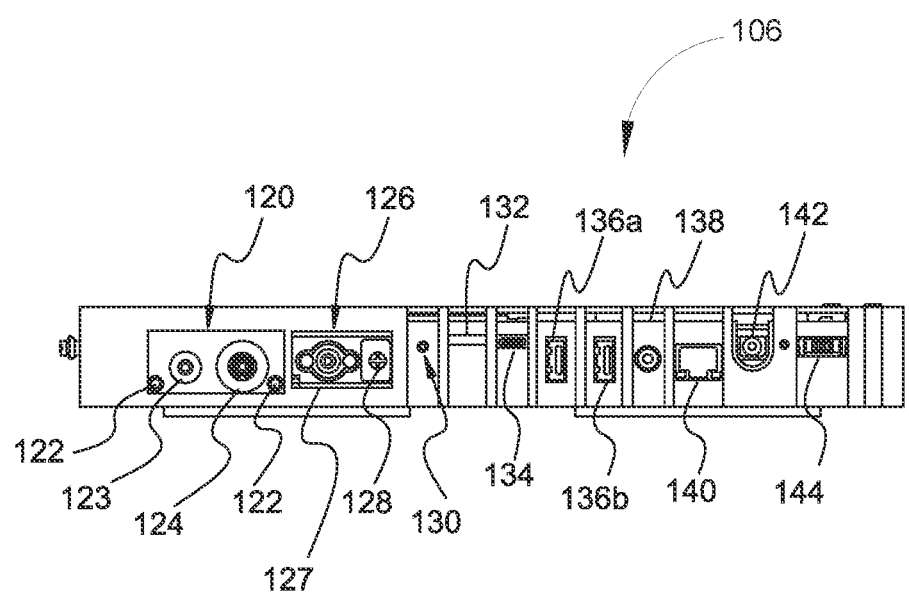
FIG. 12B illustrates a back side view of a base module, according to an example of the present disclosure.

FIG. 12B illustrates a back side view of Base Module 106, according to an example. In an example, Base Module 106 includes a plurality of modular elements used for cell site installation, testing, measurement, and maintenance. According to an example, Base Module 106 includes PM-DL module 120, also known as a power meter/datalink optical module. PM-DL module 120 and other modules described herein may be factory installed with Base Module 106 or one or more modules may be attached to Base Module 106 by a user. In an example, PM-DL module 120 is secured by way of connection members 122. Connection members 122 provide integration of PM-DL 120 and mechanical structural support for an optical connection. PM-DL module 120 includes power meter port 123 and TS-PC port 124, also known as a Talkset-Datalink port. Power meter port 123 is used to determine optical power of a fiber under test. TS-PC port 124 is used to communicate voice or data with another device along an optical fiber.

Power meter port 123 and TS-PC port 124 may be optical Universal Push Pull (UPP) connectors, compatible with all diameter 2.5 mm connectors (fiber connector (FC), subscriber connector (SC), straight tip (ST) connector, Deutsches Institut für Normung (DIN) connector, E2000, etc.). An FC connector is a single mode connector using a 2.5 mm ferrule according to Telecommunications Industry Association (TIA) connector intermateability standard FOCIS-4 (TIA-604-4). An SC connector is a snap-in connector using a 2.5 mm ferrule according to TIA connector intermateability standard FOCIS-3 (TIA-604-3). An ST connector is a spring-loaded optical connector that has a bayonet mount and a long cylindrical 2.5 mm ceramic ferrule to hold the fiber according to TIA connector intermateability standard FOCIS-2 (TIA-604-2). A DIN connector is a fiber connector having a 2.5 mm ferrule and a screw type connector according to International Electrotechnical Commission standard IEC 61754-3. An E-2000 connector is a fiber connector having a 2.5 mm ferrule and a snap coupling and a light and dust cap according to IEC standard 61754-15.

According to an example, Base Module 106 also includes VFL module 126, also known as a Visual Fault Locator module, to provide detection of a visual fault location. VFL module 126 includes VFL optical port 127 and port 128. According to an example, VFL optical port 127 is a UPP connector. A VFL test uses brightly visible light to check patch cords for defects and verify continuity. According to examples, combinations of PM-DL module 120 and VFL module 126 may provide various functions including: 1. Power Meter-Only; 2. Talkset and Datalink; 3. Talkset and Datalink & Power Meter; 4. VFL-Only; and 5. VFL & Power Meter.

According to an example, Base Module 106 includes several additional inputs and control interfaces as follows. Reset button 130 provides a hard reset of test instrument 100. Reset button 130 may be depressed with a small object, such as an extended paperclip. Micro-SD port 132 provides removable storage to test instrument 100 by accepting a micro-SD card. The micro-SD card may provide memory for storing cell site data, predetermined setup configurations, test results, and compiled reports. USB-C port 134 provides an interface to test instrument 100 according to the USB-C standard. USB-C port 134 also provides a debug-serial-port to support testing and trouble-shooting of test instrument 100. An audio interface, and/or headset may be multiplexed with USB-C port 134 by way of an external adapter, such as a USB-C to 3 mm adapter. A pair of USB-A Interfaces 136*a* and 136*b* provides support for connection of USB 2.0/3.0 peripherals, such as an external fiber microscope, set forth in greater detail below.

Audio jack 138 provides a direct audio interface by accepting a 3 mm male plug. Ethernet port 140 is RJ-45 jack to provide 10/100/1000-BaseT Ethernet management. On/Off switch 142 is configured to turn test instrument 100 on and off. DC-input 144 is configured to receive DC power for test instrument 100 from an external power supply. In addition, an internal smart battery module may provide DC power. Although not illustrated in FIG. 12B, a mini-USB port may also be provided. Internal to Base Module 106 is a wireless network module to support wireless network communication, such as at 2.4 GHz and 5 GHz, and a Bluetooth module to support Bluetooth communication with an external device, such as a Bluetooth audio headset.

Figure 12C:
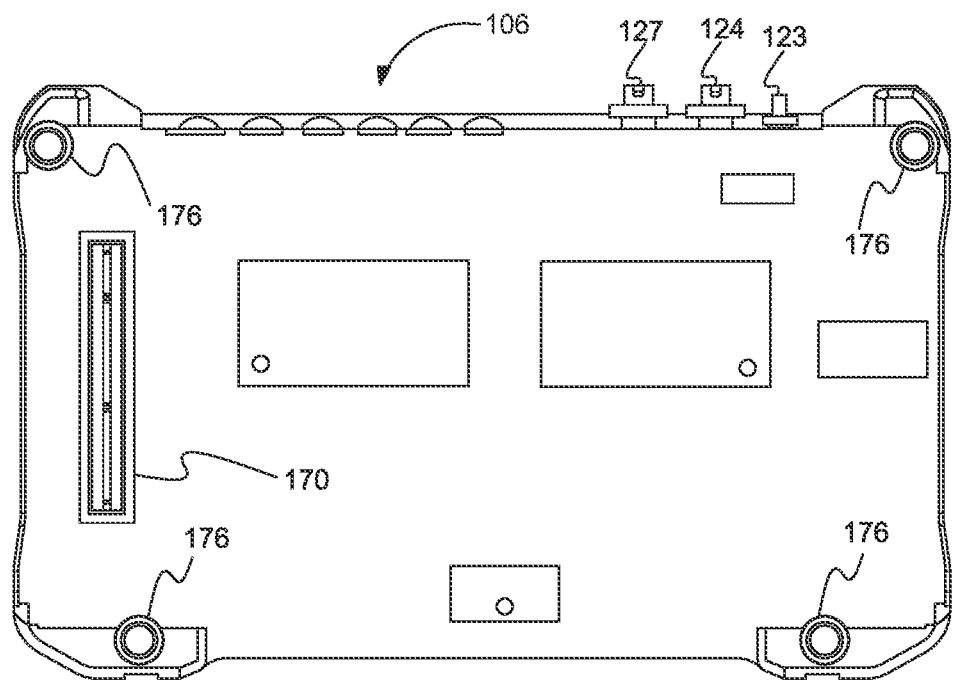
FIG. 12C illustrates a top view of a base module, according to an example of the present disclosure.

FIG. 12C illustrates a top view of Base Module 106, according to an example of the present disclosure. Base Module 106 includes a plurality of through holes 176 to mate with corresponding protrusions 174 in the housing of I/O device 102. Base Module 106 provides electrical power and communication to I/O device 102 or other modules, including Solution Modules and Expansion Modules, by way of base module backplane interface 170. According to an example, base module backplane interface 170 is a 140-pin connector having 0.8 mm pitch Gold-Fingers. Other types of connectors may be used.

Figure 12D:
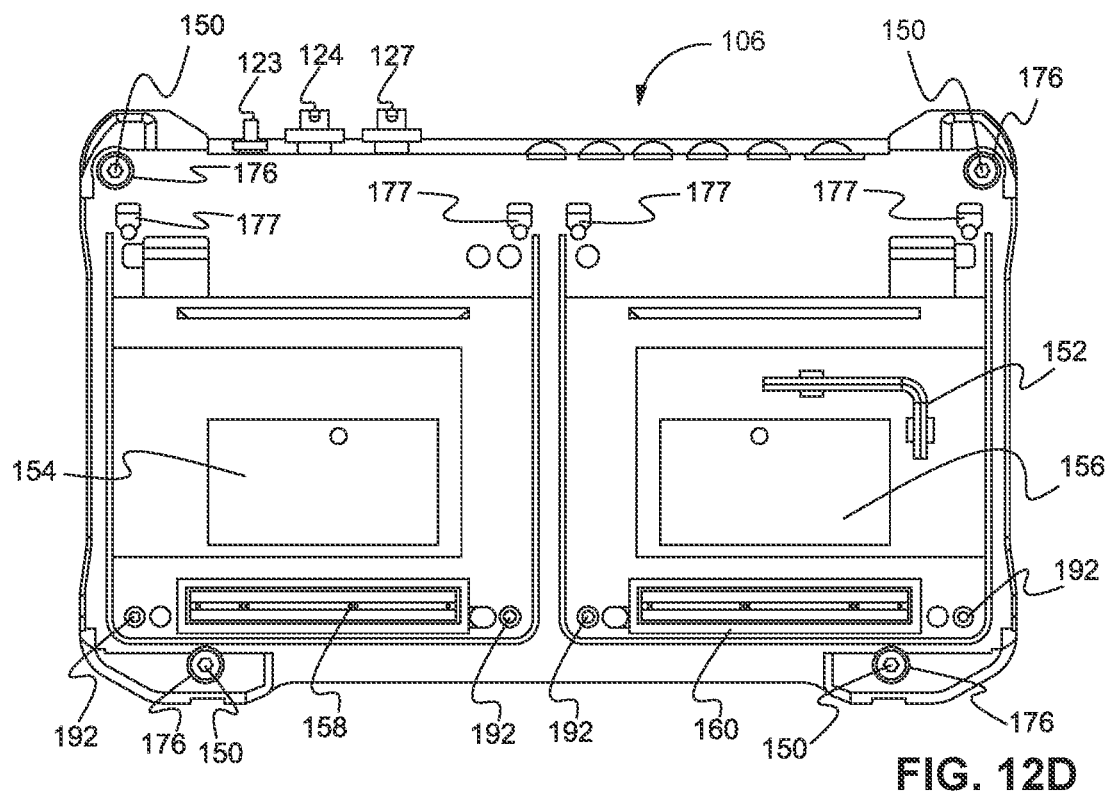
FIG. 12D illustrates a bottom view of a base module, according to an example of the present disclosure.

FIG. 12D illustrates a bottom view of Base Module 106, according to an example of the present disclosure. Base Module 106 includes a plurality of through holes 176 to receive a plurality of connection members 150 to removably secure Base Module 106 to I/O device 102. If another Solution Module is removably inserted between Base Module 106 and I/O device 102, connection members 150 pass through structurally defined holes in the inserted Solution Module before being received into I/O device 102. According to an example, connection members 150 are machine screws having a hexagonal head. According to an example, connection tool 152 is disposed within Base Module 106 to support field replacement of different removably connectable Solution Modules (attachable to a top side of Base Module 106). According to an example, connection tool 152 is an Allen wrench having a hexagonal head to mate with connection members 150. Base Module 106 includes a plurality of access panels, such as access panels 154 and 156 to support factory installation of various internal modules, such as the wireless network module or Bluetooth module.

Base Module 106 includes first expansion interface 158 and second expansion interface 160 to provide electrical communication and power to a plurality of different Expansion Modules. According to an example, first expansion interface 158 and second expansion interface 160 are 140 pin connectors having 0.8 mm pitch Gold-Fingers. According to an example, the bottom of Base Module 106 includes recesses to receive corresponding cleats from Expansion Modules, such as cleats 188 shown in FIG. 12E of expansion modules 110 and 111. Threaded bushings 192 then receive structural members, which pass through holes in the Expansion Modules to be received therein.

Figure 12E:
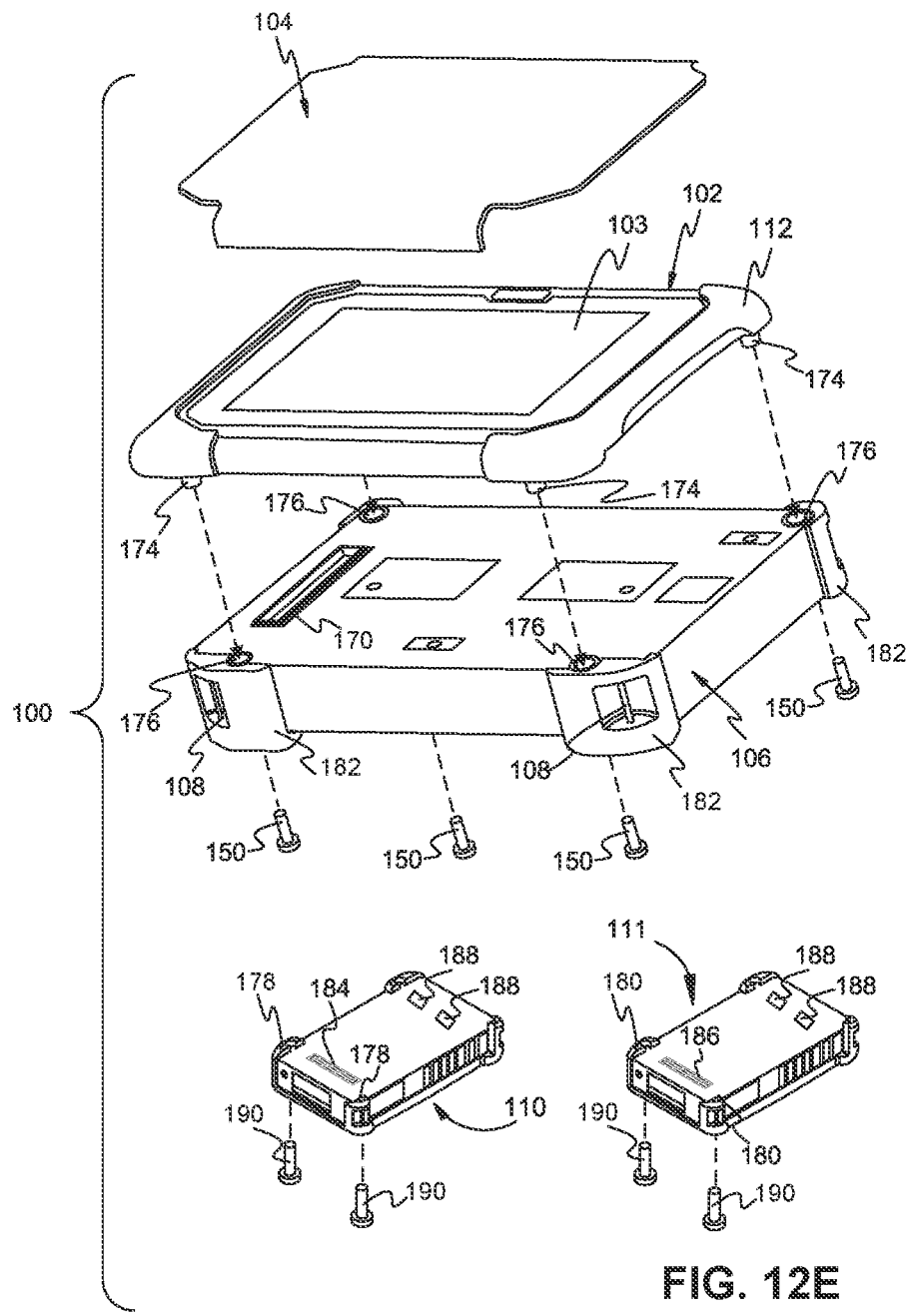
FIG. 12E illustrates an exploded perspective view of a test instrument including an input/output (I/O device), a base module, and dual expansion modules, according to an example of the present disclosure.

FIG. 12E illustrates an exploded perspective view of test instrument 100 including I/O device 102, Base Module 106, and expansion modules 110 and 111, according to an example of the present disclosure. An optional screen cover 104 may be removably attached to the housing of I/O device 102 to provide protection to display 103. Base Module 106 is removably connected to I/O device 102 by a plurality of connection members 150. According to an example, I/O device 102 includes a plurality of protrusions 174 that are configured to be received within through-holes 176 defined by the structural housing of Base Module 106. Connection members 150 pass through holes 176 and are removably received within protrusions 174 to create an integrated modular test instrument 100. As illustrated, elastomeric members 182 are disposed about the corners of Base Module 106 to provide impact protection.

According to an example, first expansion module 110 has structure defining holes 178 and expansion module 111 has structure defining holes 180. Connection members 190 pass through holes 178 and 180 and are received within threaded bushings 192 of Base Module 106. Cleats 188 of expansion modules 110 and 111 are received within recesses 177 in the bottom of Base Module 106.

First expansion module 110 includes expansion interface 184 to communicate power and control signals with Base Module 106. Likewise, expansion module 111 includes expansion interface 186 to communicate power and control signals. According to an example, expansion interfaces 184 and 186 are 140 pin connectors having 0.8 mm pitch Gold-Fingers to mate with first and second expansion interfaces 158, 160 in Base Module 106. According to an example, expansion modules 110 and 111 are field replaceable. For example, the expansion modules may include one or more 400 G and 100 G modules. According to an example, either of expansion modules 110 or 111 may be a smart battery module. According to an example, either of expansion modules 110 or 111 may be a spacer module that does not contain internal components or a battery.

Figure 12F:
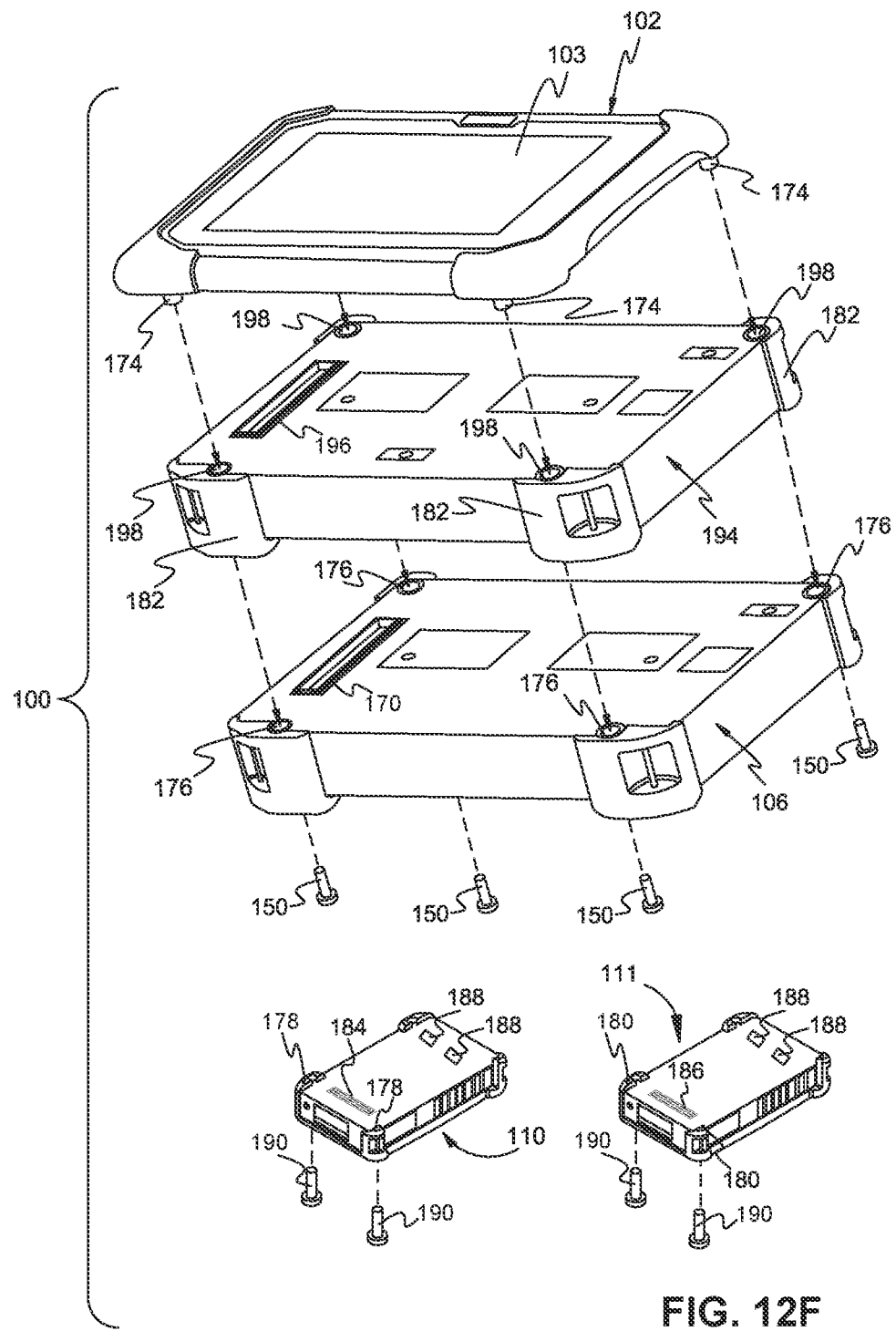
FIG. 12F illustrates an exploded perspective view of a test instrument including a removably connected first solution module, according to an example of the present disclosure.

FIG. 12F illustrates an exploded perspective view of test instrument 100 including a removably connected module 194, according to an example of the present disclosure. Upon integration of module 194, Base Module 106 provides electrical power and communication to module 194 by base module backplane interface 170. Likewise, module 194 provides electrical power and communication to I/O device 102 by way of top solution interface 196. Module 194 also includes a bottom solution interface (not shown) connectable to base module backplane interface 170, described in greater detail below. According to another example, a second module may be optionally disposed between module 194 and Base Module 106, described in greater detail below. The base module backplane interface 170 connects power and communication (e.g., carrying data) busses of the Base Module 106 to modules connected to the Base Module 106 via base module backplane interface 170 or other interfaces. The backplane interface 170 is also connected to a memory and processor of a module.

Module 194 has a similar housing and form factor to Base Module 106 to provide integration between I/O device 102 and Base Module 106. Module 194 includes a plurality of through holes 198 to mate with corresponding protrusions 174 in the housing of I/O device 102. Module 194 provides electrical power and communication to I/O device 102 by way of top solution interface 196. According to an example, top solution interface 196 is a 140-pin connector having 0.8 mm pitch Gold-Fingers. Module 194 also provides a structural base for test instrument 100, and includes additional support structures for attachment of a support strap (not shown). Module 194 is removably connected to I/O device 102 by connection members 150. As illustrated, Module 194 also includes elastomeric bumpers 182 for impact protection.

Figure 13:
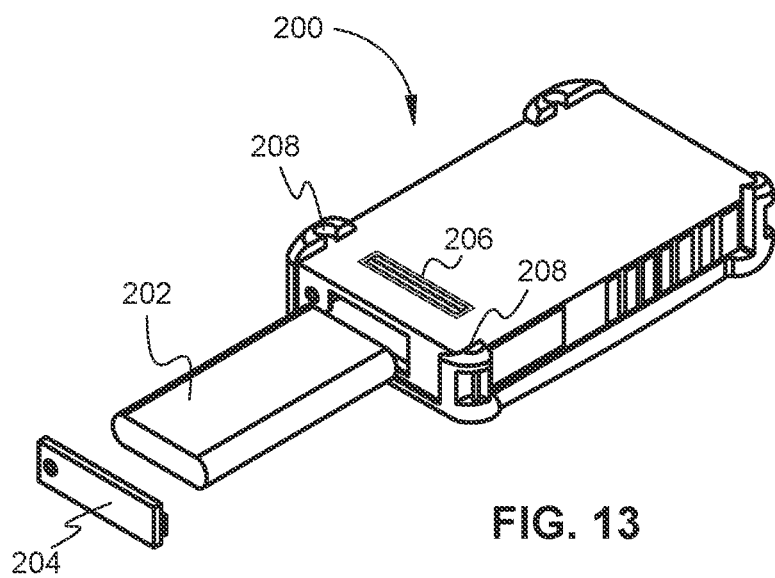
FIG. 13 illustrates a perspective view of removably connectable smart battery module in the form of an expansion module, according to an example of the present disclosure.

FIG. 13 illustrates a perspective view of removably connectable smart battery module 200 in the form of an expansion module, such as first expansion module 110, according to an example of the present disclosure. Smart battery module 200 includes a battery 202 removably disposed therein, and secured by battery door 204. Internal circuitry is included within smart battery module 200 to regulate smart charging of battery 202 and to ensure that power is supplied to Base Module 106 in a uniform manner. Smart battery module 200 provides power and communication with Base Module 406 by way of expansion interface 206. According to an example, expansion interface 206 is a 140-pin connector having 0.8 mm pitch Gold-Fingers. 208 may be bumpers for protection.

Figure 14A:
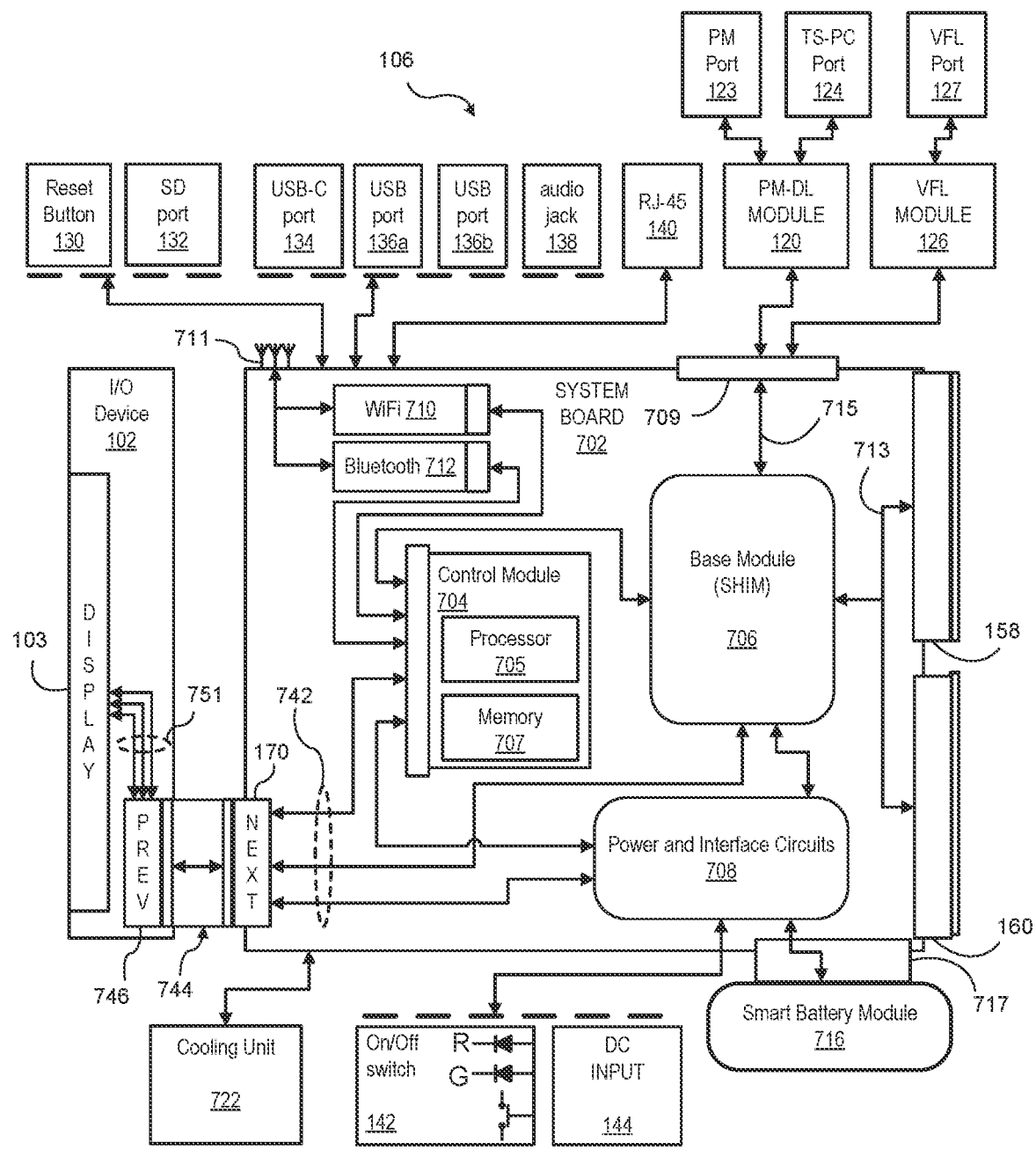
FIG. 14A illustrates a high-level system diagram of a base module and an I/O device, according to an example of the present disclosure.

FIG. 14A illustrates a high-level system diagram of Base Module 106 and I/O device 102, according to an example of the present disclosure. Base Module 106 includes system board 702 with interfaces to removably connect to various Solution Modules and Expansion Modules to form test instrument 100. System board 702 removably connects to I/O device 102, which houses and supports display 103. According to an example, I/O device 102 is embodied in a modular housing, which is removably connectable to Base Module 106. According to an example, display 103 is disposed within I/O device 102 and a GUI may be generated on the display 103 to provide user control of test instrument 100 for testing and measurement. The modular housing of I/O device 102 permits both field replaceability and connection of various additional Solution Modules. According to an example, Base Module 106 is on the order of 10" wide to permit hand carry by a field technician.

System board 702 includes a control module 704. According to an example, Control module 704 includes processor 705 and memory 707. According to an example, processor 705 may include a programmable and replaceable processor module/card used in a test instrument system where pluggable/upgradable/flexible processor selection is desired. According to an example, processor 705 may be a multi-core, programmable, processor. According to an example memory 707 may be a 12CV EEPROM. Processor 705 processes software instructions stored in memory 707.

According to an example, control module 704 facilitates a flexible processor choice for processor 705 such as an iMX6 or iMX8 processor from NXP semiconductor or other processor. Control module 704 may be a SMARC control module based on SMARC Version 2.0, and capable of supplying up to 15 W (5V/3 A) to processor 705. SMARC is a versatile small form factor computer Module definition. SMARC is essentially a replaceable processor module/card used in a system where pluggable/upgradable/flexible processor selection is desired. SMARC is a specification published by the Standardization Group for Embedded Technologies for computer-on-modules (i.e., COMs). SMARC Computer-on-Modules are specifically designed for the development of extremely compact low-power systems. SMARC modules can also be fitted with other low-power System-on-Chip (SoC) architectures, like, for example, ones based on x86 SoCs.

System board 702 includes base module SHIM 706, which is a Software/Hardware Interface for Multi-Many-core (SHIM) interface, such as set forth in 2804-2019—IEEE Standard for Software-Hardware Interface for Multi-Many-Core. Base module SHIM 706 provides an architecture to support connection to a plurality of additional modules. Base module SHIM 706 connects to PM-DL module 120 and VFL module 126 with base module bus 715 through with base module interface 709. Base module SHIM 706 connects to expansion interfaces 158 and 160 with expansion bus 713. Base module SHIM 706 connects to base module backplane interface 170 through base module backplane 742. According to an example, expansion interfaces 158 and 160 are 140 pin connectors having 0.8 mm pitch Gold-Fingers to electrically mate with a plurality of different modules. Base module SHIM 706 connects to power and interface circuits 708 to distribute power to connected modules through base module bus 715 and expansion bus 713.

According to an example, I/O device 102 is removably connectable to Base Module 106. I/O device 102 includes a display 103 that provides user control and user information, a listing of predetermined tests to be executed (i.e., a predetermined test plan), a listing of reports to be compiled, a compilation of executed test results in test reports, and interface control for communication with a work station or server. I/O device 102 includes an I/O backplane 751 that connects to base module backplane 742 of Base Module 106 at backplane interface junction 744. I/O backplane interface 746 forms part of I/O device 102 and base module backplane interface 170 forms part of Base Module 106. Together, I/O backplane interface 746 and base module backplane interface 170 form junction backplane interface junction 744. The designation of PREV and NEXT provide a reference for connectivity of various modules in various configurations to base module backplane 742 in the various FIG.s.

According to an example, I/O device 102 is contained in a removable modular housing. In other words, display 103 functions as a special Solution Module. This permits both field replaceability and access within the platform to insert additional Solution Modules. According to an embodiment, display 103 supports a 1280×800 resolution with multi-touch capacitive interface capability. According to an example, a screen size on the order of 10" diagonal size is provided. According to another example, a screen size on the order of 8" diagonal size is provided. According to an example, display 103 is backlit to provide readable brightness in an outdoor environment.

According to an example, power and interface circuits 708 receive power from internal smart battery module 716 by way of smart battery interface 717. According to an example, smart battery module 716 includes a dedicated battery internal to the structure of the Base Module 106. The dedicated internal battery is field replaceable and is also rechargeable via power and interface circuits 708. The power and interface circuits 708 may also receive power by way of DC input 144. Power and interface circuits 708 may also receive power by way of an Expansion Module containing a smart battery. Operation of Base Module 106 is initiated or turned off by way of On/Off switch 142. Accordingly, the internal battery within smart battery module 716 may be recharged when DC power is supplied by way of DC input 144. The internal circuitry of Base Module 106 is cooled by cooling unit 722, which may include a fan, a heat sink, a temperature senor and/or combination thereof. According to an example, control of a fan within cooling unit 722 is provided by way of a temperature sensor that provides a temperature indication signal to Control module 704, which in turn controls operation of the fan.

Reset button 724 provides a hard reset of Base Module 106. Reset button 130 may be depressed with a small object, such as an extended paperclip. SD port 132 provides removable storage to Base Module 106 by receiving a removable micro-SD card 726. The micro-SD card may provide memory for storing customer data, setup configurations, reports, and test results. A pair of USB ports 136a and 136b provides support for connection of USB 2.0/3.0 peripherals. USB-C port 134 provides a debug-serial-port to support testing and trouble-shooting of Base Module 106, and an external audio interface (and/or headset). The external headset may be multiplexed with USB-C port 134 by way of an external adapter, such as a USB-C to 3 mm adapter. Audio jack 138 may provide a direct audio interface by accepting a 3 mm male plug. Ethernet port 140 is an RJ-45 jack to provide 10/100/1000-BaseT Ethernet management.

Wireless network module 710 provides a wireless network interface to Base Module 106 by way of communication between antenna 711 and Control module 704. Bluetooth module 712 provides a Bluetooth interface to Base Module 106 by way of communication between antenna 711 and Control module 704. According to an example, wireless network module 710 and Bluetooth module 712 form the same module. According to an example, several wireless options, such as Wi-Fi and Bluetooth configuration choices, are supported.

According to an example, wireless network module 710 or Bluetooth module 712 may be accessed separately after Base Module 106 is fully assembled and enclosed. This permits a factory-option of wireless network or Bluetooth to meet varying end user requirements. Although not shown, a Wireless-Module access 'door' may be provided with a special fastener, different from the connection members set forth above, to discourage access without a special-tool. According to an example, three internal Wi-Fi antennas of antennas 711 may be mounted within Base Module 106, and optionally one internal Bluetooth antenna.

According to an example, Base Module 106 includes optional PM-DL module 120, also known as a power meter/datalink optical sub module. According to an example, the PM-DL 120 connects to base module SHIM 706 through base module bus 715 and base module interface 709 and is factory installed into the Base Module 106. PM-DL 120 includes power meter port 123 and Talkset-Datalink (TS-PC) port 124. TS-PC port 124 is an optical connector that is UPP, which is compatible with all diameter 2.5 mm connectors (FC, SC, ST, DIN, E2000, etc.). According to an example, Base Module 106 also includes VFL module 126 to provide visual fault location. VFL module 126 connects to base module SHIM 706 through base module bus 715 and base module interface 709. VFL module 126 includes a VFL optical port 127. According to an example, the VFL optical port is an optical connector that is UPP, which is compatible with all diameter 2.5 mm connectors (FC, SC, ST, DIN, E2000, etc.). According to an example, optional VFL module 126 is factory installed into the Base Module 106. According to examples, various combinations of power meter module 300 (included in PM-DL module 120), talkset datalink module 320 (included in PM-DL module 120), and visual fault locator module 126 are available to support: 1. Power Meter only; 2. Talkset and Datalink only; 3. Talkset and Datalink & Power Meter; 4. VFL only; and 5. VFL & Power Meter. According to an example, Base Module 106 also includes factory installed internal modules, supporting the following options: Talkset & Power Meter; Power Meter & VFL; VFL only; and Power Meter only.

According to an example, cooling unit 722 includes an integrated fan with a speed control to manage internal temperature of the system board 702, Control module 704, wireless network module 710, and smart battery module 716. Base Module 106 power consumption may be affected by choice of processor module, contained within Control module 704. According to an example, Base Module 106 has a power budget on the order of 15 W including display 103 at full brightness (exclusive of extra power required for battery charging). According to an example, system power supplied to Base Module 106 from DC input 144 is a maximum of 15 A*26V (390 W). According to an example, Base Module 106 includes "Apple-MFI" circuitry for compatibility with "Apple" products, and all USB ports are capable of supplying 0.5 A DC at 5V to external USB Load. According to an example, an Audio/Headset may be muxed with USB-C port and accommodated using an adapter (i.e., USB-C to 3 mm). According to an example, a platform loudspeaker (not shown) is provided within Base Module 106 or I/O device 102 to provide audio without requirement for connection of an audio headset. According to an example, DC power may be applied to DC input 144 by way of a 160 W AC-DC Power Brick.

According to an example, internal smart battery module 716 includes a single battery, which is field replaceable. Battery access is provided without need to disassemble/remove any of its Modules. According to an example, the battery compartment of Base Module 106 may be compatible with Inspired-Energy NH2054VV34. According to an example the primary battery may be 14.4V, 6.8 A-hr, 98 Wh, 8 A capable NH2054VV34, having a run time on the order of four hours. According to another example, dual battery support may be provided by connection of another smart battery to expansion interface 158 or expansion interface 160. An additional smart battery may provide additional power to support module scalability.

According to an example, Base Module 106 supports expansion modules 110 and 111 (e.g., OTDR, 400 G, 100 G, etc.) for connection at expansion interfaces 158 and 160, and full size Solution Modules for connection at base module backplane interface 170. According to an example, Base Module 106 may support up to four removably connectable modules, namely two removably connectable Expansion Modules by way of hardware interfaces, such as expansion interfaces 158 and 160, and two full-size removably connectable Solution Modules by way of a hardware interface, such as base module backplane interface 170.

Figure 14B:
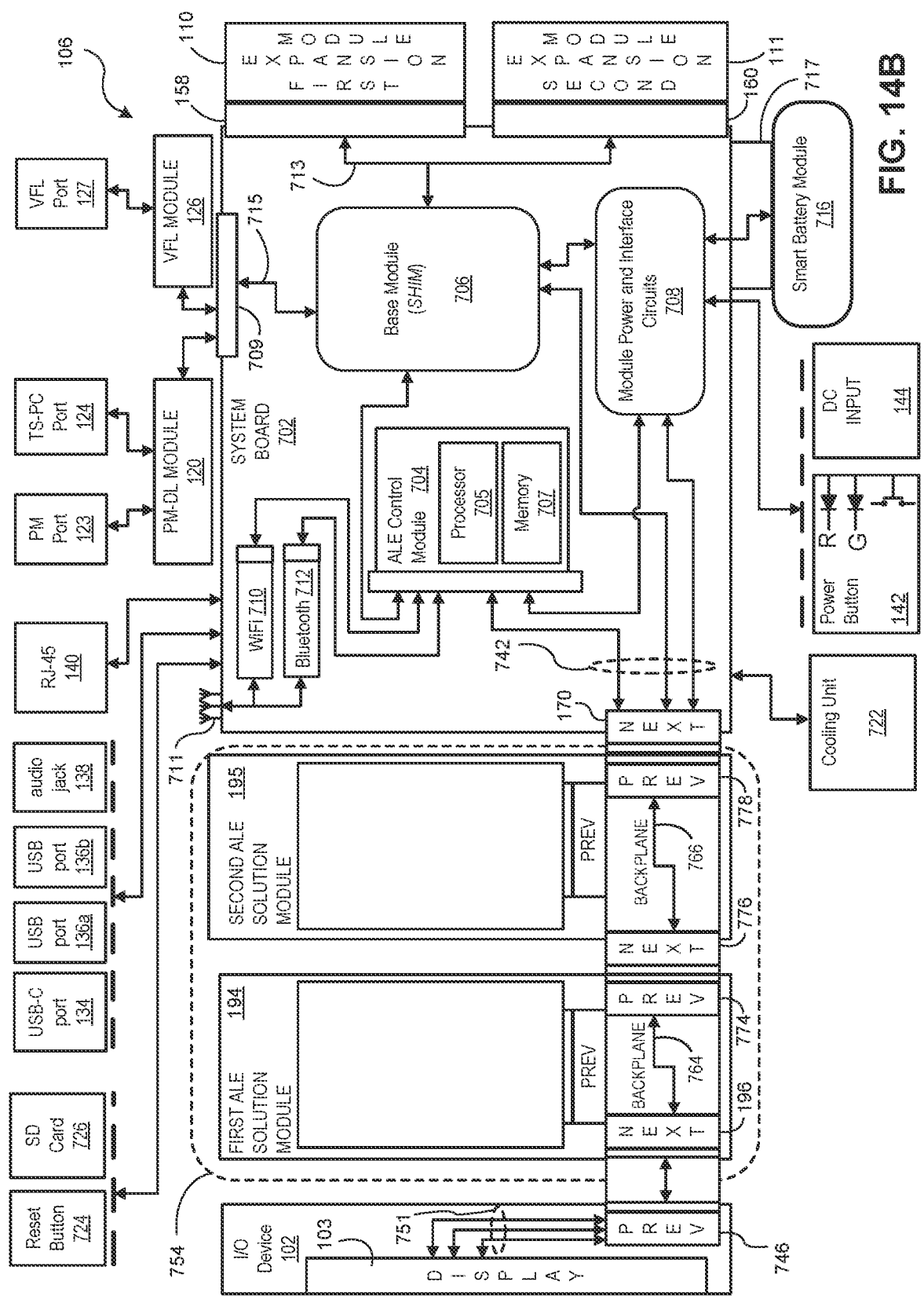
FIG. 14B illustrates a high-level system diagram of a base module a removably connected to a first solution module, a second solution module, and an I/O device, according to an example of the present disclosure.

FIG. 14B illustrates a high-level system architectural diagram of Base Module 106 removably connected to module 194, second solution module 195, and I/O device 102, according to an example of the present disclosure. Solution Modules 194 and 195, shown in dashed box 754, are removably connectable between I/O device 102 and Base Module 106 to form an integrated test instrument 100. According to an example, either of solution modules 194 or 195 may be a Spectrum Analyzer and Common Public Radio Interface Module. Base Module 106 connects to expansion module 110 at first expansion interface 158 and second expansion module 111 at second expansion interface 160. According to an example, Base Module 106 maintains a small to mid-range, hand held form factor.

According to the illustrated example of FIG. 14B, module 194 includes a backplane 764 connected to top solution interface 196, designated as NEXT, and a bottom solution interface 774, designated as PREV. Top solution interface 196 is disposed on a top side of module 194 for connection to an interface disposed on the bottom side of an adjacent Solution Module, such as I/O backplane interface 746 of I/O device 102. Bottom solution interface 774 is disposed on a bottom side of module 194 for connection to an interface disposed on a top side of an adjacent Solution Module, such as top solution interface 776 of second solution module 195. According to an example of the test instrument 100 with module 194 included as a single solution module (i.e., without second solution module 195), bottom solution interface 774 connects to base module backplane interface 170.

Second solution module 195 includes a backplane 766 connected to top solution interface 776, designated as NEXT, and a bottom solution interface 778, designated as PREV. Top solution interface 776 is disposed on a top side of second solution module 195 for connection to an interface disposed on the bottom side of an adjacent Solution Module, such as bottom solution interface 774 of module 194. Bottom solution interface 778 is disposed on a bottom side of second solution module 195 for connection to an interface disposed on a top side of an adjacent Solution Module, such as backplane interface 170 of Base Module 106. According to an example of the test instrument 100 with module 194 and second solution module 195, base module backplane 742 is connected to backplane 766 of second solution module 195, backplane 764 of module 194, and backplane 751 of I/O device 102.

According to FIG. 14B, module 194 and second solution module 195 include backplanes. Either module 194 or second solution module 195 may support a single internal module configuration or a dual internal module configuration.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. A test instrument to test optical fiber networks or other types of networks, the test instrument comprising:
   a base module comprising:
      a memory;
      a processor to determine test results for a network test performed by the test instrument and store the test results in the memory;
      a backplane connected to the memory and processor and carrying power and communication signals; and
      a hardware interface connecting the backplane of the base module to a removable module removably connected to the base module, wherein the removable module includes hardware resources;
   wherein the base module and the removable module each comprise:
      a container comprising a thread to perform at least one operation of a network test application, an application name discovery and routing service (ANDR), an ANDR database, and a namespace,
      wherein the ANDRs maintain the ANDR databases, and the ANDR databases include entries that describe the threads in each container, and
      the ANDRs send command and control messages to each other to utilize at least one of the threads running in another container based on at least one of the entries in the ANDR databases.

2. The test instrument of claim 1, wherein each ANDR determines if a thread of the threads for the network test application is running in a different container based on the ANDR database, and in response to determining the thread is running in the different container, send a command and control message of the command and control messages to the ANDR of the different container to run the thread based on input parameters provided in the command and control message.

3. The test instrument of claim 2, wherein in response to determining the thread is not executing in the different container, running the thread in current container of the ANDR.

4. The test instrument of claim 1, wherein each ANDR registers network test applications and threads for the network test applications running in its container and other containers responsive to receiving register messages from the network test applications or other ANDRs.

5. The test instrument of claim 1, wherein each ANDR sends a message to another ANDR to identify new threads after startup of the container.

6. The test instrument of claim 1, wherein the ANDRs discover each other using an ANDR discovery protocol at container startup.

7. The test instrument of claim 1, wherein each of the command and control messages comprise a destination address including a unique domain name of the namespace of the ANDR to receive the command and control message.

8. The test instrument of claim 1, wherein the removable module comprises a module to test 400 Gigabit or 100 Gigabit circuits, a module to test quad small form-factor pluggable units, or an optical time domain reflectometer module.

9. A network test instrument to test a network, the network test instrument comprising:
   a base module including a base module processor, a base module memory, a first container comprising a first thread to perform at least one operation of a network test application, a first namespace, a first application name discovery and routing service (ANDR), and a first ANDR database; and
   a second module including a second module processor, a second module memory, a second container comprising a second thread to perform at least one other operation of the network test application, a second namespace, a second ANDR, and a second ANDR database,
   wherein the first ANDR and the second ANDR register the network test application and the first and second threads, and domains for each thread, in the first ANDR database and the second ANDR database, and
   the first ANDR communicates via a command and control message addressed to the second ANDR to utilize the second thread of the network test application running in a second domain instead of launching the second thread in a first domain for the first ANDR.

10. The network test instrument of claim 9, wherein the first thread comprises a user interface thread running in the first container, and the user interface thread collects user input for executing the network test application, and
   wherein the second thread comprises an input validation thread running in the second container, and the first ANDR determines the input validation thread is running in the second domain based on an entry in the first ANDR database, and
   the first ANDR transmits the command and control message to the second ANDR to run the input validation thread on the user input in the second domain.

11. The network test instrument of claim 9, wherein the first ANDR determines a hardware gating thread for the network test application is running in a different domain other than the first domain based on the first ANDR database, and transmits another command and control message to an ANDR of the different domain to cause the hardware gating thread to gate inputs based on an interrupt from a hardware abstraction layer thread.

12. The network test instrument of claim 9, wherein the first ANDR determines a network analysis thread and a system download thread for the network test application are running in a different domain other than the first domain, and transmits at least one other command and control message to an ANDR of the different domain to cause the network analysis thread and the system download thread to analyze and display test results.

13. The network test instrument of claim 9, wherein the first ANDR searches the first ANDR database to determine whether the second thread is running in a different domain.

14. The network test instrument of claim 9, wherein the first and second ANDRs discover each other using an ANDR discovery protocol at container startup.

15. The network test instrument of claim 9, wherein the command and control message comprises a destination address including a unique domain name of the second domain.

16. The network test instrument of claim 9, wherein the second module comprises a module to test 400 Gigabit or 100 Gigabit circuits, a module to test quad small form-factor pluggable units, or an optical time domain reflectometer module.

17. A method of running a network test application comprising threads running in different containers hosted by different modules of a test instrument, the method comprising:

collecting user input for executing the network test application according to a user interface thread running in a first container of the containers;

determining whether an input validation thread of the network test application is running in a second container of the containers based on a first application name discovery and routing service (ANDR) database maintained by a first ANDR running in the first container, wherein the first ANDR database identifies threads of the network test application running in the containers; and in response to determining the input validation thread is running in the second container, transmitting a message to a second ANDR of the second container to run the input validation thread on the user input.

18. The method of claim 17, further comprising:

transmitting, from the first ANDR, another message to an ANDR of a different container running a hardware gating thread to gate an input based on a detected event or an interrupt from a Hardware Abstraction Layer thread for the network test application, wherein the different container is identified from the first ANDR database.

19. The method of claim 17, further comprising:

transmitting, from the first ANDR, other messages to one or more other ANDRs running in one or more containers different from the first container to utilize a network analysis thread and a system download thread running in the one or more of the containers to analyze and display results of the network test application, wherein the one or more containers are identified from the first ANDR database.

20. The method of claim 19, wherein the system download thread downloads a template to display the test results of the network test application.

* * * * *